US011120419B1

(12) United States Patent
Viswanath et al.

(10) Patent No.: US 11,120,419 B1
(45) Date of Patent: *Sep. 14, 2021

(54) PRESCIENT AND ADAPTIVE POINT-OF-SALE SYSTEMS

(71) Applicant: Groupon, Inc., Chicago, IL (US)

(72) Inventors: Sri Viswanath, Palo Alto, CA (US); David Gomez-Rosado, Petaluma, CA (US); Andrey Zaytsev, Los Altos, CA (US); Josh Krall, San Mateo, CA (US); Seth Harris, Greenwich, CT (US); David Scott Parker, Mountain View, CA (US); Travis Chow, Sausalito, CA (US); Qi Li, San Francisco, CA (US); Samuel Thorpe, San Francisco, CA (US); Clive Richard Beavis, Half Moon Bay, CA (US); Tihomir Tsankov Georgiev, Menlo Park, CA (US); Gabe Nydick, Fremont, CA (US); Robert James Skillington, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,944

(22) Filed: Jan. 30, 2020

Related U.S. Application Data

(63) Continuation of application No. 14/980,689, filed on Dec. 28, 2015, now Pat. No. 10,592,882.

(Continued)

(51) Int. Cl.
*G06Q 20/20* (2012.01)
*G06Q 20/36* (2012.01)
*H04L 29/06* (2006.01)

(52) U.S. Cl.
CPC ......... *G06Q 20/202* (2013.01); *G06Q 20/363* (2013.01); *H04L 63/0428* (2013.01); *H04L 63/083* (2013.01); *H04L 63/102* (2013.01)

(58) Field of Classification Search
CPC .. G06Q 20/202; G06Q 20/363; H04L 63/102; H04L 63/0428
See application file for complete search history.

(56) References Cited

U.S. PATENT DOCUMENTS

| 6,859,215 | B1 | 2/2005 | Brown et al. |
| 7,349,871 | B2 | 3/2008 | Labrou et al. |

(Continued)

*Primary Examiner* — Vanel Frenel
(74) *Attorney, Agent, or Firm* — Alston & Bird LLP

(57) ABSTRACT

Systems, apparatus, methods, and non-transitory media for providing prescient and adaptive point-of-sale services via electronic networks are discussed herein. Some embodiments may include a system with one or more servers. The one or more servers may be configured to generate digital consumer tokens and provide the digital consumer tokens to consumer devices for sharing with merchant devices. When a merchant device receives the digital consumer token, the merchant device may forward the digital consumer token to the one or more servers in exchange for consumer data to facilitate consumer service. In some embodiments, the one or more servers may be configured to provide point-of-sale interfaces that adapt to different consumer preferences or consumer device signals. Some embodiments may provide for consumer interfaces that allow consumers to manage their electronic identity at various (e.g., merchant) locations.

20 Claims, 9 Drawing Sheets

Related U.S. Application Data

(60) Provisional application No. 62/099,019, filed on Dec. 31, 2014, provisional application No. 62/099,013, filed on Dec. 31, 2014.

(56) References Cited

U.S. PATENT DOCUMENTS

| | | |
|---|---|---|
| 8,666,812 B1 | 3/2014 | Gandhi |
| 9,262,781 B2 | 2/2016 | MacKinnon |
| 10,438,200 B1 * | 10/2019 | Griffith ............... H04L 63/0853 |
| 10,594,484 B2 * | 3/2020 | Rodriguez ............ H04L 9/0822 |
| 10,721,226 B1 * | 7/2020 | Kurani ................ H04L 63/0876 |
| 2003/0208409 A1 | 11/2003 | Mault |
| 2006/0247824 A1 | 11/2006 | Walker et al. |
| 2009/0132492 A1 | 5/2009 | Satoh et al. |
| 2010/0280895 A1 | 11/2010 | Mottola |
| 2011/0040655 A1 | 2/2011 | Hendrickson |
| 2012/0173336 A1 | 7/2012 | Strumolo |
| 2012/0259782 A1 | 10/2012 | Hammad |
| 2012/0310838 A1 | 12/2012 | Harris et al. |
| 2013/0110676 A1 | 5/2013 | Kobres |
| 2013/0144701 A1 | 6/2013 | Kulasooriya et al. |
| 2013/0198080 A1 | 8/2013 | Anderson et al. |
| 2014/0081847 A1 | 3/2014 | King et al. |
| 2014/0200997 A1 | 7/2014 | Anderson et al. |
| 2014/0201004 A1 | 7/2014 | Parundekar et al. |
| 2015/0052010 A1 | 2/2015 | Alba et al. |

\* cited by examiner

PRESCIENT AND ADAPTIVE POINT-OF-SALE SYSTEMS

CROSS-REFERENCE TO RELATED APPLICATIONS

This application is a continuation of and claims priority to U.S. application Ser. No. 14/980,689, titled "Prescient And Adaptive Point-Of-Sale Systems," filed Dec. 28, 2015, which claims the benefit of U.S. Provisional Application No. 62/099,019, titled "Prescient and Adaptive Point-Of-Sale Systems," filed Dec. 31, 2014, and U.S. Provisional Application No. 62/099,013, titled "Prescient and Adaptive Point-Of-Sale Systems," filed Dec. 31, 2014, the entireties of which are hereby incorporated by reference.

FIELD

Embodiments of the invention relate, generally, to techniques for providing prescient and adaptive point-of-sale systems that are structured and configured to facilitate consumer and merchant transactions and related activity.

BACKGROUND

Financial transactions between merchants and consumers typically require the consumers to present a form of payment to the merchant. As a result, consumers may be required to keep wallets that include payment instruments such as cash, credit cards, debit cards, deal vouchers, coupons, reward tracking cards, checks or the like that may be accepted by merchants and/or devices used at the point-of-sale locations (e.g., point-of-sale devices, such as cash registers, credit card readers, etc.). In addition, such point-of-sale devices may communicate with merchant inventory management systems. Applicant has identified a number of problems associated with conventional point-of-sale devices and merchant inventory management systems. Through applied effort, ingenuity, and innovation, solutions to such problems have been identified and are described in detail below.

BRIEF SUMMARY

Some embodiments may provide for a system configured to facilitate interactions between merchant and consumer devices. For example, the system may include one or more servers including: communications circuitry configured to connect with consumer devices and merchant devices via a network. The one or more servers may further include consumer profile service circuitry configured to: generate a digital consumer token; associate the digital consumer token with a public consumer profile; and provide, via the network, the digital consumer token to a consumer device associated with the public consumer profile. The one or more servers may further include point-of-sale service circuitry configured to: receive, via the network, the digital consumer token from a merchant device indicating that the consumer device has provided the digital consumer token to the merchant device; subsequent to receiving the digital consumer token: identify the public consumer profile based on the digital consumer token; and provide, via the network, the public consumer profile to the merchant device.

In some embodiments, the consumer profile service circuitry may be further configured to associate the digital consumer token with a private consumer profile. The point-of-sale circuitry may be further configured to: determine whether the merchant device is authorized to receive a private consumer profile; and in response to determining that the merchant device is authorized to receive the private consumer profile, provide the private consumer profile to the merchant device via the network.

In some embodiments, the consumer profile service circuitry may be further configured to: provide, via the network and to the consumer device, a consumer interface configured to facilitate creation of discretionary data via consumer device inputs, wherein the discretionary data defines the public consumer profile and the private consumer profile; receive, via the network and from the consumer device, the discretionary data; generate the public consumer profile based on a first portion of the discretionary data; and generate the private consumer profile based on a second portion of the discretionary data.

In some embodiments, a third portion of the discretionary data further may define sharing rules. The consumer profile service circuitry is further configured to determine the first portion of the discretionary data associated with the public consumer profile and the second portion of the discretionary data associated with the private consumer profile based on the third portion of the discretionary data.

In some embodiments, the point-of-sale service circuitry may be further configured to: generate a point-of-sale interface based on at least one of the public consumer profile and the private consumer profile; and provide the point-of-sale interface to the merchant device via the network.

In some embodiments, the private consumer profile may include stored payment data. The point-of-sale circuitry may be further configured to, in response to determining that the merchant device is authorized to receive the private consumer profile, facilitate a transaction based on the stored payment data.

In some embodiments, the point-of-sale circuitry configured to determine whether the merchant device is authorized to receive the private consumer profile may include the point-of-sale circuitry being configured to determine whether the merchant device is authorized to receive the private consumer profile subsequent to providing the public consumer profile to the merchant device.

In some embodiments, the point-of-sale service circuitry may be further configured to: generate a point-of-sale interface; provide the point-of-sale interface to the merchant device via the network; and receive, from the merchant device and via the network, transaction data associated with a transaction. The consumer profile service circuitry may be further configured to update at least one of the public consumer profile and the private consumer profile based on the transaction data.

In some embodiments, the consumer profile service circuitry may be further configured to receive discretionary data from the consumer device via the network indicating that the merchant is pre-approved to receive the private consumer profile. The point-of-sale service circuitry configured to determine whether the merchant device is authorized to receive the private consumer profile may include the point-of-sale service circuitry being configured to determine whether the merchant device is authorized to receive the private consumer profile based on the discretionary data.

In some embodiments, the consumer profile service circuitry is further configured to: provide, via the network and to the consumer device, a consumer interface configured to facilitate creation of discretionary data via consumer device inputs, wherein the discretionary data defines the public consumer profile; receive, via the network and from the consumer device, the discretionary data; and generate the public consumer profile based on at least a portion of the discretionary data.

In some embodiments, the point-of-sale service circuitry may be further configured to: generate a point-of-sale interface; provide the point-of-sale interface to the merchant device via the network; and receive, from the merchant device and via the network, transaction data associated with a transaction. The consumer profile service circuitry may be further configured to update the public consumer profile based on the transaction data.

In some embodiments, the consumer profile service circuitry may be further configured to associate the digital consumer token with a private consumer profile. The point-of-sale circuitry may be further configured to: determine whether the merchant device is authorized to receive a private consumer profile; and subsequent determining that the merchant device fails to be authorized to receive the private consumer profile: receive, via the network and from the consumer device, merchant approval data indicating consumer approval for access to the private consumer profile wherein the private consumer profile includes stored payment, wherein the merchant approval data includes at least one of touchscreen data and biometric data; and in response to receiving the merchant approval data, facilitate a transaction based on the stored payment data associated with the private consumer profile.

In some embodiments, the merchant approval data may be generated in response to a request to the consumer device sent from at least one of the point-of-sale service circuitry and the merchant device.

In some embodiments, the point-of-sale service circuitry may be further configured to receive, from at least one of the consumer device and the merchant device via the network, one or more real-time consumer device signals. The consumer profile service circuitry may be further configured to update at least one of the public consumer profile and the private consumer profile based on the one or more real-time consumer device signals.

Some embodiments may provide for a machine-implemented method. The method may include: generating, by processing circuitry of one or more servers configured to communicate with consumer devices and merchant devices via a network, a digital consumer token; associating, by the processing circuitry, the digital consumer token with a public consumer profile; providing, by the processing circuitry and via the network, the digital consumer token to a consumer device associated with the public consumer profile; receiving, by the processing circuitry and via the network, the digital consumer token from a merchant device indicating that the consumer device has provided the digital consumer token to the merchant device; subsequent to receiving the digital consumer token, and by the processing circuitry: identifying the public consumer profile based on the digital consumer token; and providing, via the network, the public consumer profile to the merchant device.

In some embodiments, the method may further include, by the processing circuitry: associating the digital consumer token with a private consumer profile; determining whether the merchant device is authorized to receive a private consumer profile; and in response to determining that the merchant device is authorized to receive the private consumer profile, providing the private consumer profile to the merchant device via the network.

In some embodiments, the method may further include: providing, via the network and to the consumer device, a consumer interface configured to facilitate creation of discretionary data via consumer device inputs, wherein the discretionary data defines the public consumer profile and the private consumer profile; receiving, via the network and from the consumer device, the discretionary data; generating the public consumer profile based on a first portion of the discretionary data; and generating the private consumer profile based on a second portion of the discretionary data.

In some embodiments, a third portion of the discretionary data may further define sharing rules. The method further may include determining the first portion of the discretionary data associated with the public consumer profile and the second portion of the discretionary data associated with the private consumer profile based on the third portion of the discretionary data.

In some embodiments, the method may further include, by the processing circuitry: generating a point-of-sale interface based on at least one of the public consumer profile and the private consumer profile; and providing the point-of-sale interface to the merchant device via the network.

In some embodiments, the private consumer profile may include stored payment data. The method further may include, in response to determining that the merchant device is authorized to receive the private consumer profile, facilitating a transaction based on the stored payment data.

In some embodiments, determining whether the merchant device is authorized to receive the private consumer profile may include determining whether the merchant device is authorized to receive the private consumer profile subsequent to providing the public consumer profile to the merchant device.

In some embodiments, the method may further include, by the processing circuitry: generating a point-of-sale interface; providing the point-of-sale interface to the merchant device via the network; receiving, from the merchant device and via the network, transaction data associated with a transaction; and updating at least one of the public consumer profile and the private consumer profile based on the transaction data.

In some embodiments, the method may further include: receiving discretionary data from the consumer device via the network indicating that the merchant is pre-approved to receive the private consumer profile. Determining whether the merchant device is authorized to receive the private consumer profile may include determining whether the merchant device is authorized to receive the private consumer profile based on the discretionary data.

In some embodiments, the method may further include, by the processing circuitry: providing, via the network and to the consumer device, a consumer interface configured to facilitate creation of discretionary data via consumer device inputs, wherein the discretionary data defines the public consumer profile; receiving, via the network and from the consumer device, the discretionary data; and generating the public consumer profile based on at least a portion of the discretionary data.

In some embodiments, the method may further include, by the processing circuitry: generating a point-of-sale interface; providing the point-of-sale interface to the merchant device via the network; receiving, from the merchant device and via the network, transaction data associated with a transaction; and updating the public consumer profile based on the transaction data.

In some embodiments, the method may further include, by the processing circuitry: associating the digital consumer token with a private consumer profile; determining whether the merchant device is authorized to receive a private consumer profile; and subsequent determining that the merchant device fails to be authorized to receive the private consumer profile: receiving, via the network and from the consumer device, merchant approval data indicating consumer approval for access to the private consumer profile wherein the private consumer profile includes stored payment, wherein the merchant approval data includes at least one of touchscreen data and biometric data; and in response to receiving the merchant approval data, facilitating a transaction based on the stored payment data associated with the private consumer profile.

In some embodiments, the merchant approval data may be generated in response to a request to the consumer device sent from at least one of the point-of-sale service circuitry and the merchant device.

In some embodiments, the method may further include, by the processing circuitry, receiving, from at least one of the consumer device and the merchant device via the network, one or more real-time consumer device signals; and updating at least one of the public consumer profile and the private consumer profile based on the one or more real-time consumer device signals.

Some embodiments may provide for a consumer device, including: communication circuitry configured to connect with merchant devices and a central system; and processing circuitry configured to: determine discretionary data defining consumer information; determine sharing rules associated with the discretionary data, wherein the sharing rules associate at least a portion of the discretionary data with a public consumer profile; provide the discretionary data and the sharing rules to the central system for sharing with the merchant devices; subsequent to providing the discretionary data to the central system, receive a digital consumer token from the central system, wherein the digital consumer token is configured to be exchanged by the merchant devices for the public consumer profile; and transmit the consumer device token to a merchant device.

In some embodiments, the sharing rules may associate a first portion of the discretionary data with the public consumer profile and a second portion of the discretionary data with a private consumer profile. The sharing rules may further define whether the merchant device is authorized to receive the private consumer profile. The digital consumer token may be configured to be exchanged by the merchant devices for the private consumer profile based on the sharing rules.

BRIEF DESCRIPTION OF THE DRAWINGS

Figure 1:
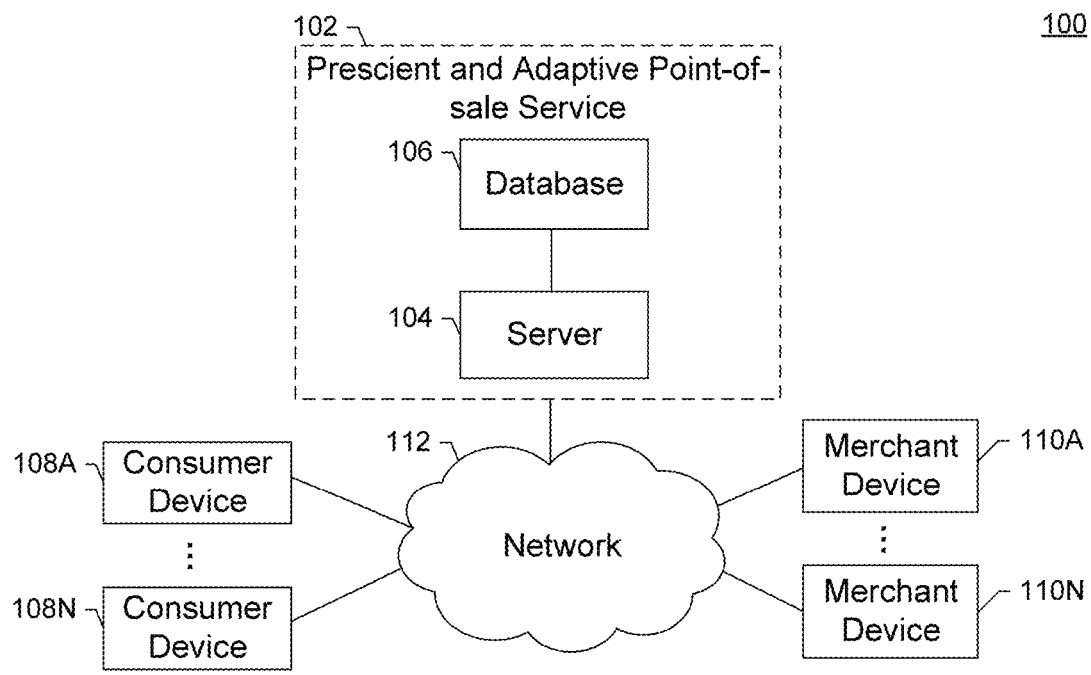
Figure 2:
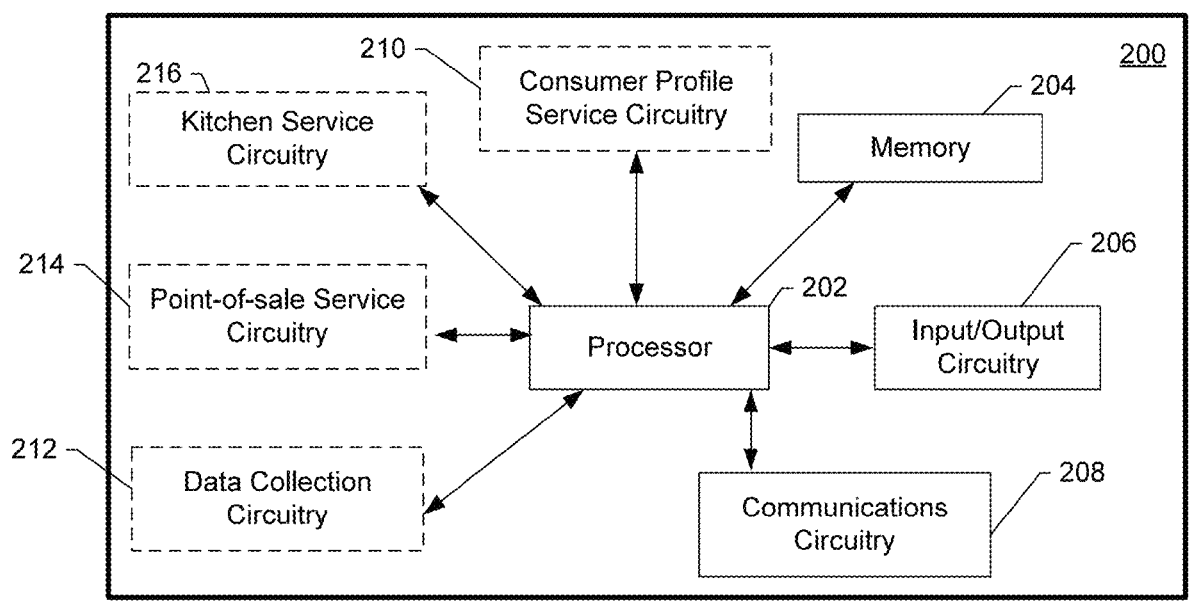
Figure 3:
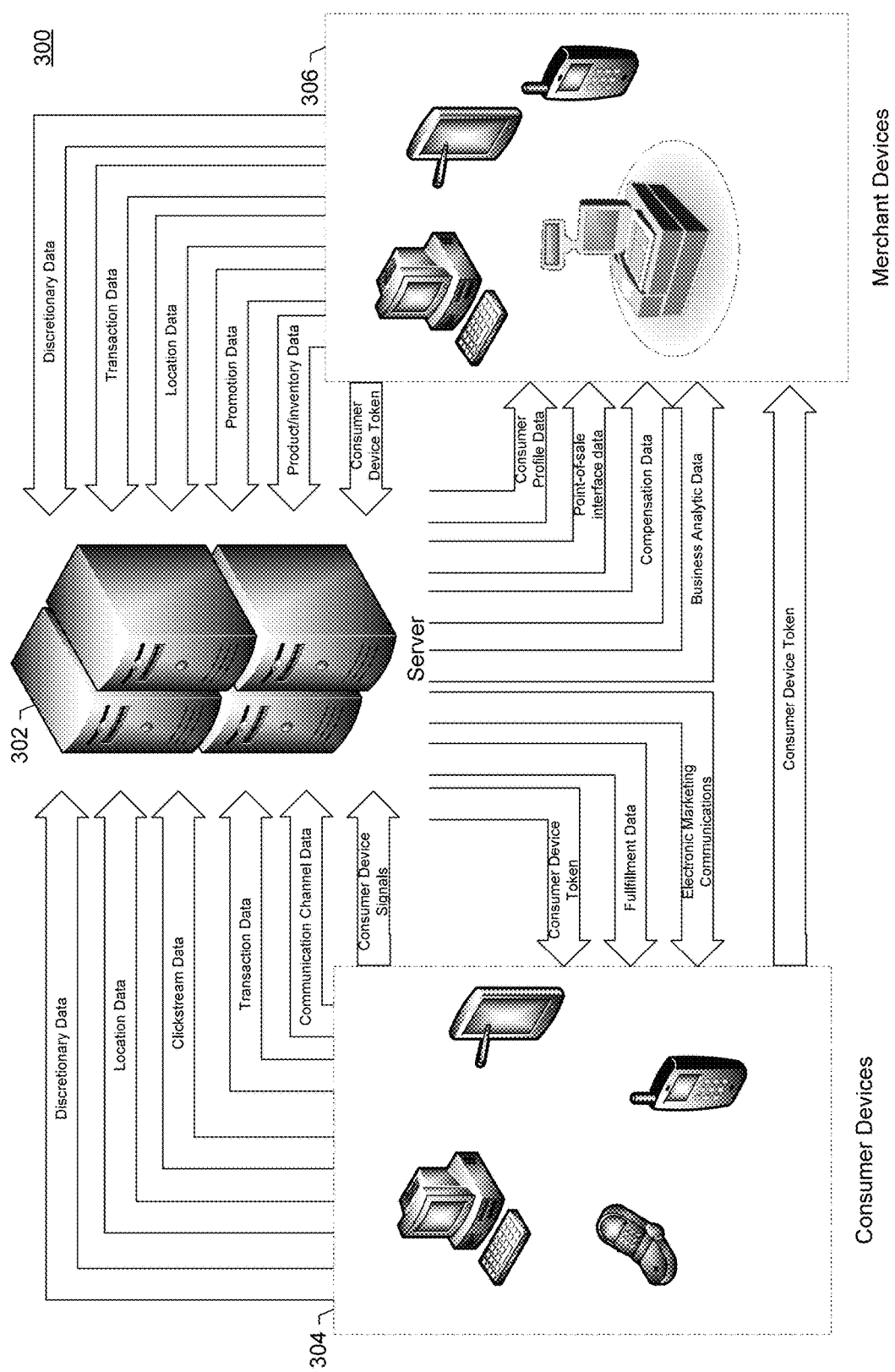
Figure 4:
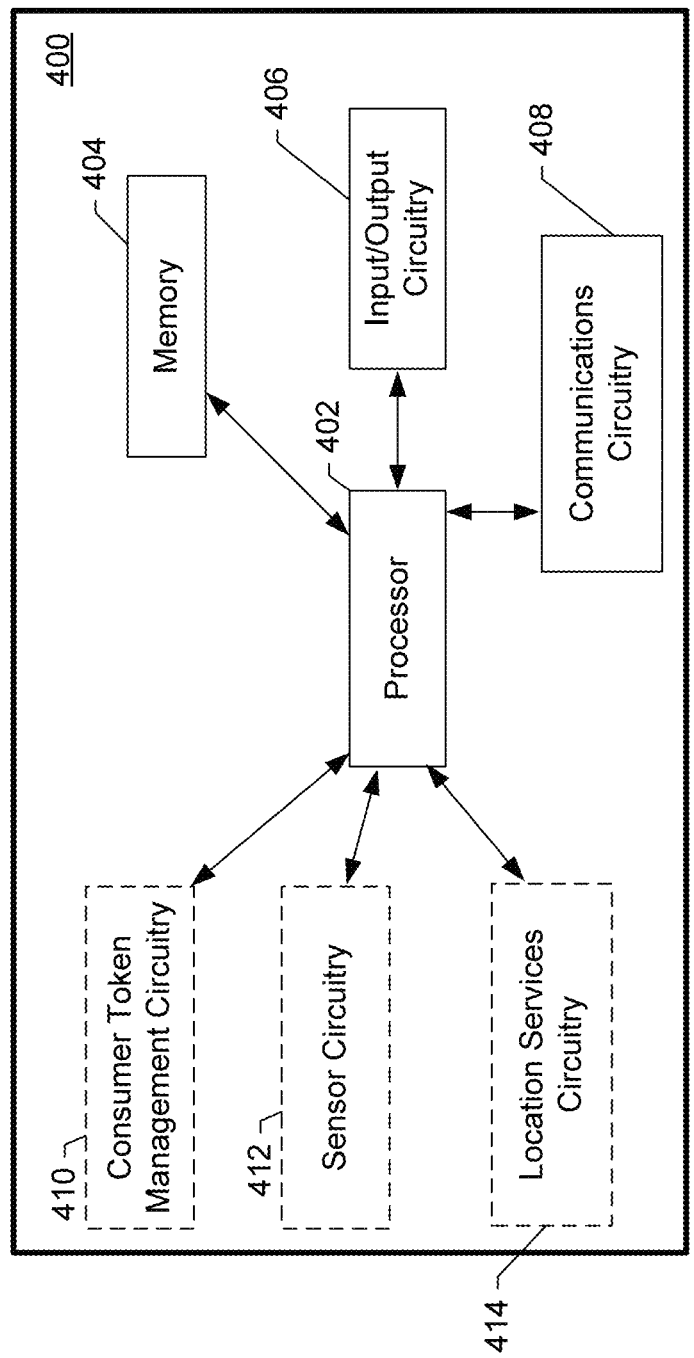
Figure 5:
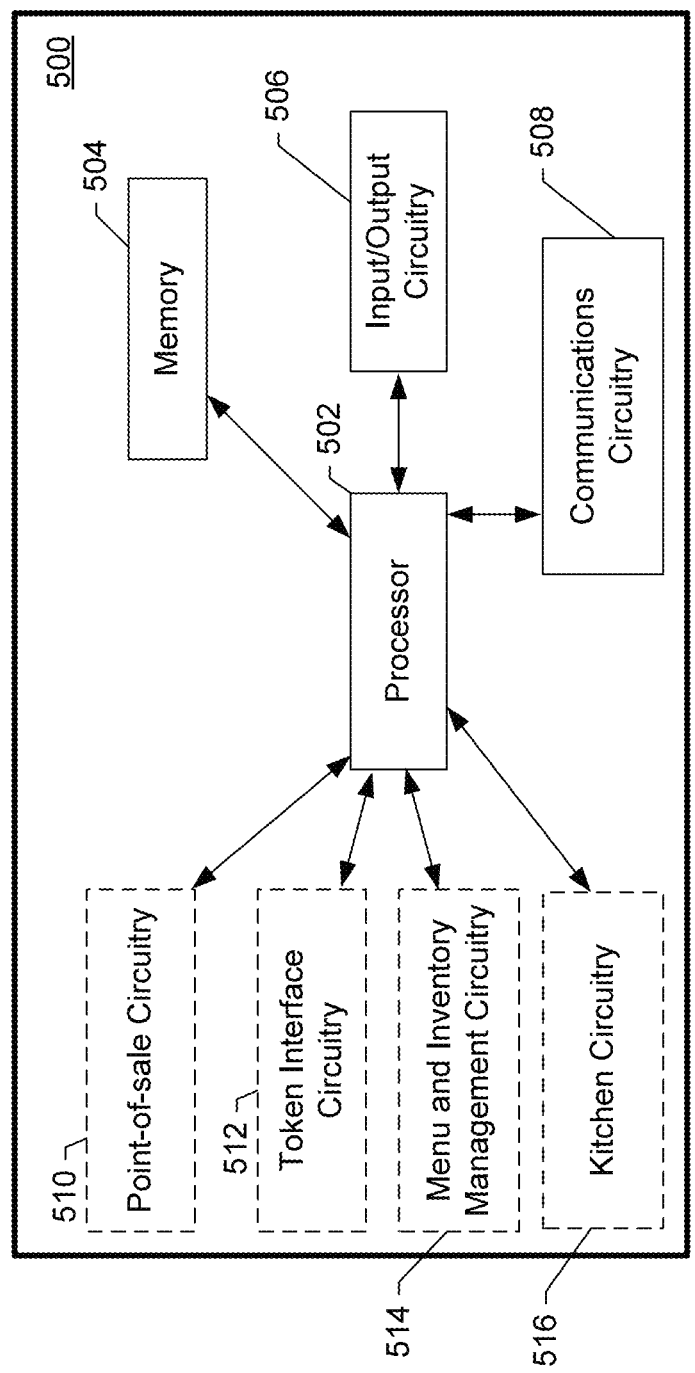
Figure 6:
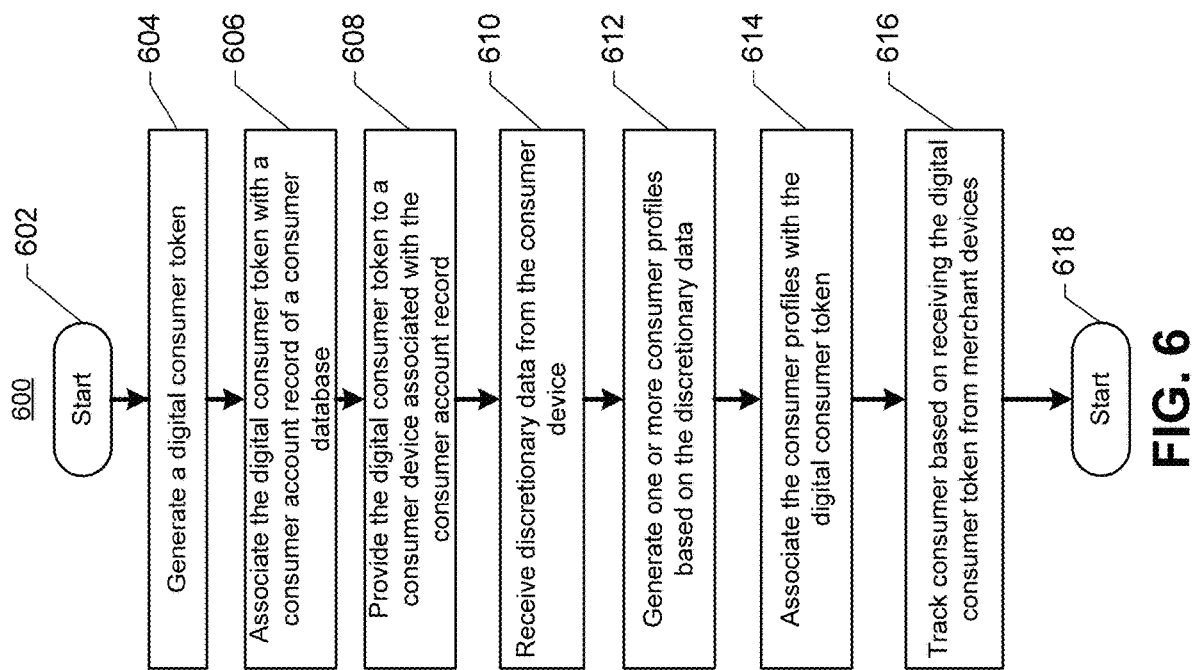
Figure 7:
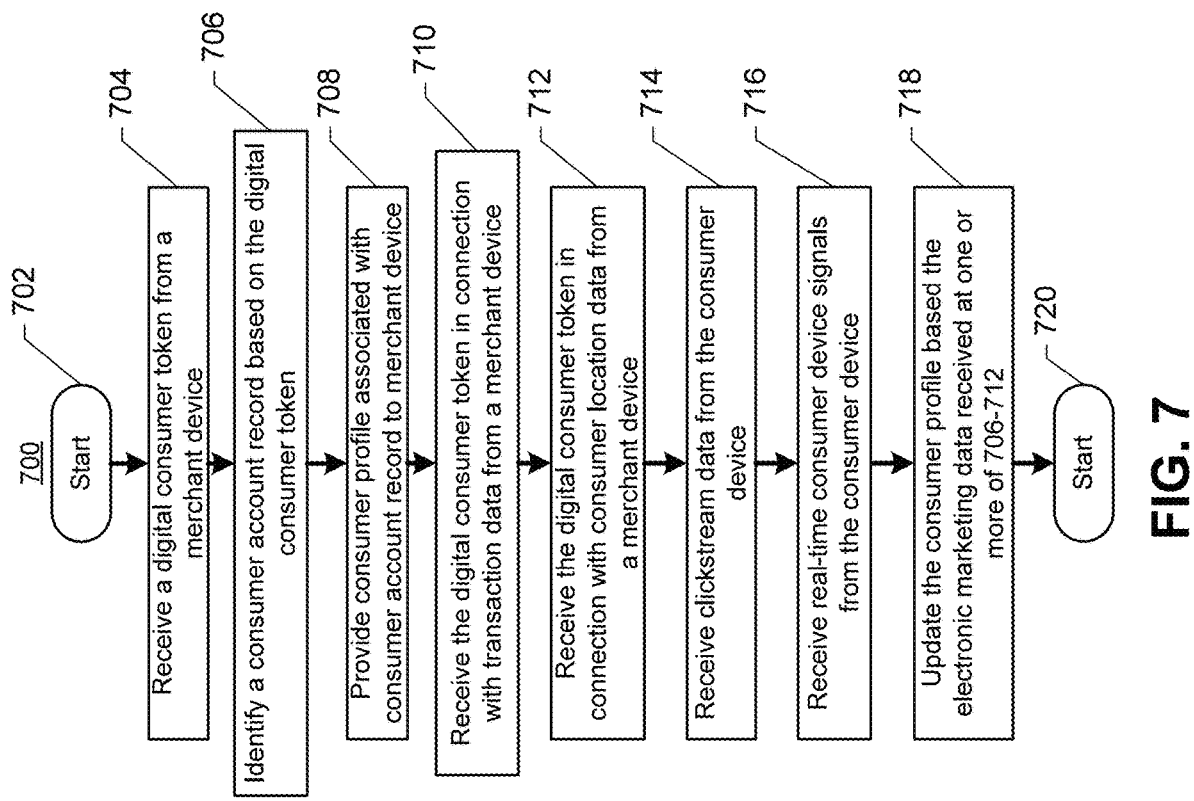
Figure 8:
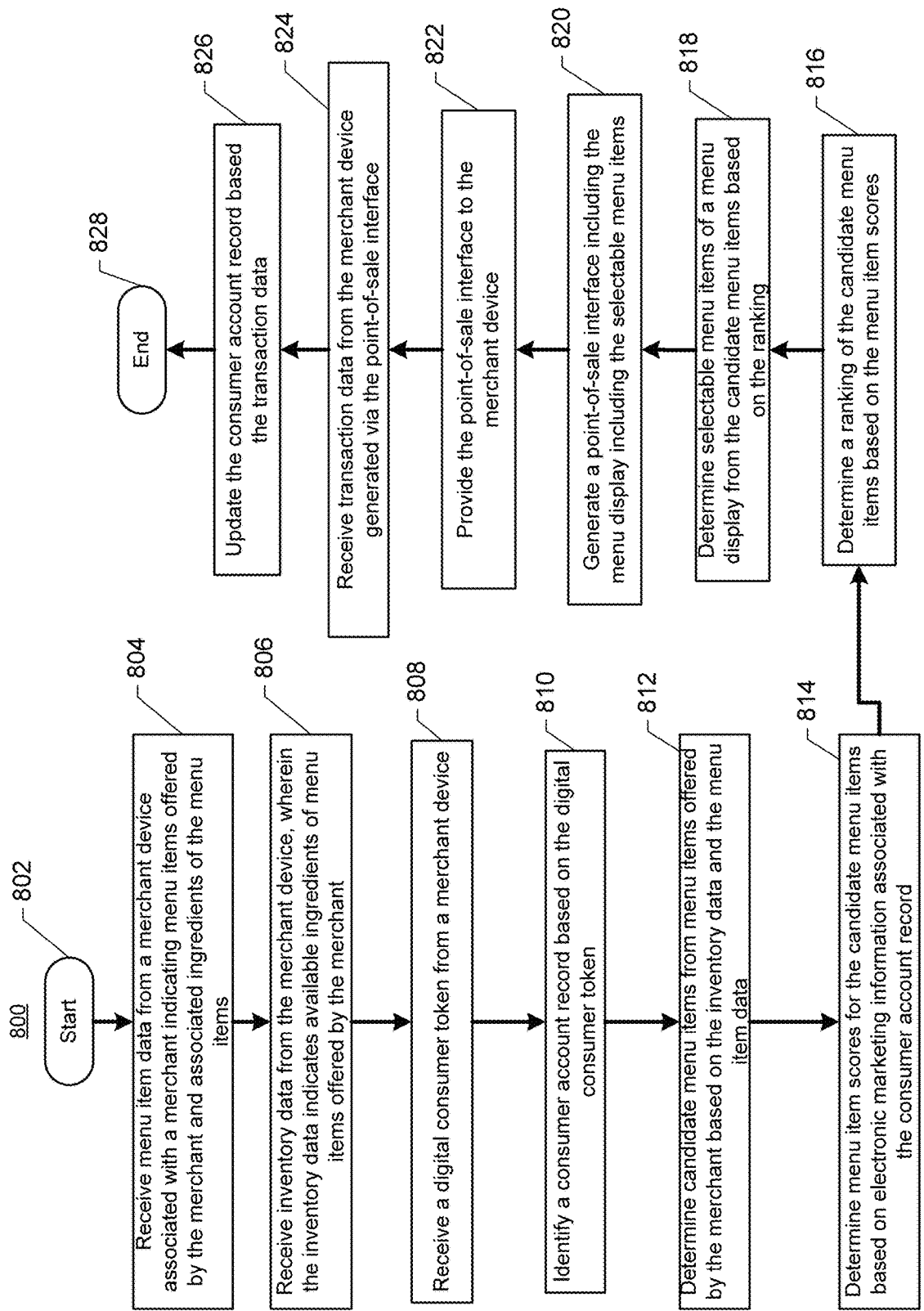
Figure 9:
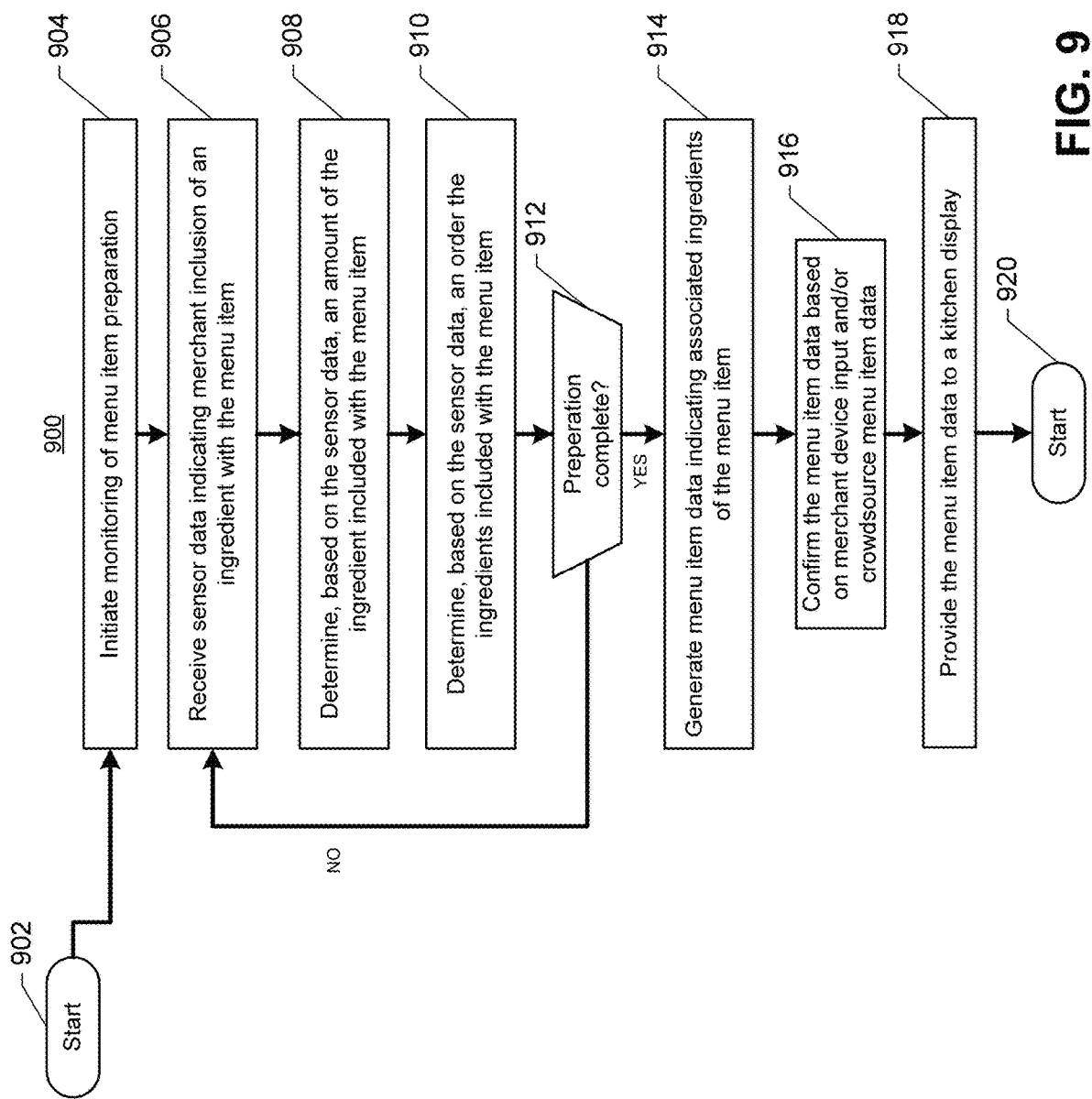
Figure 10:
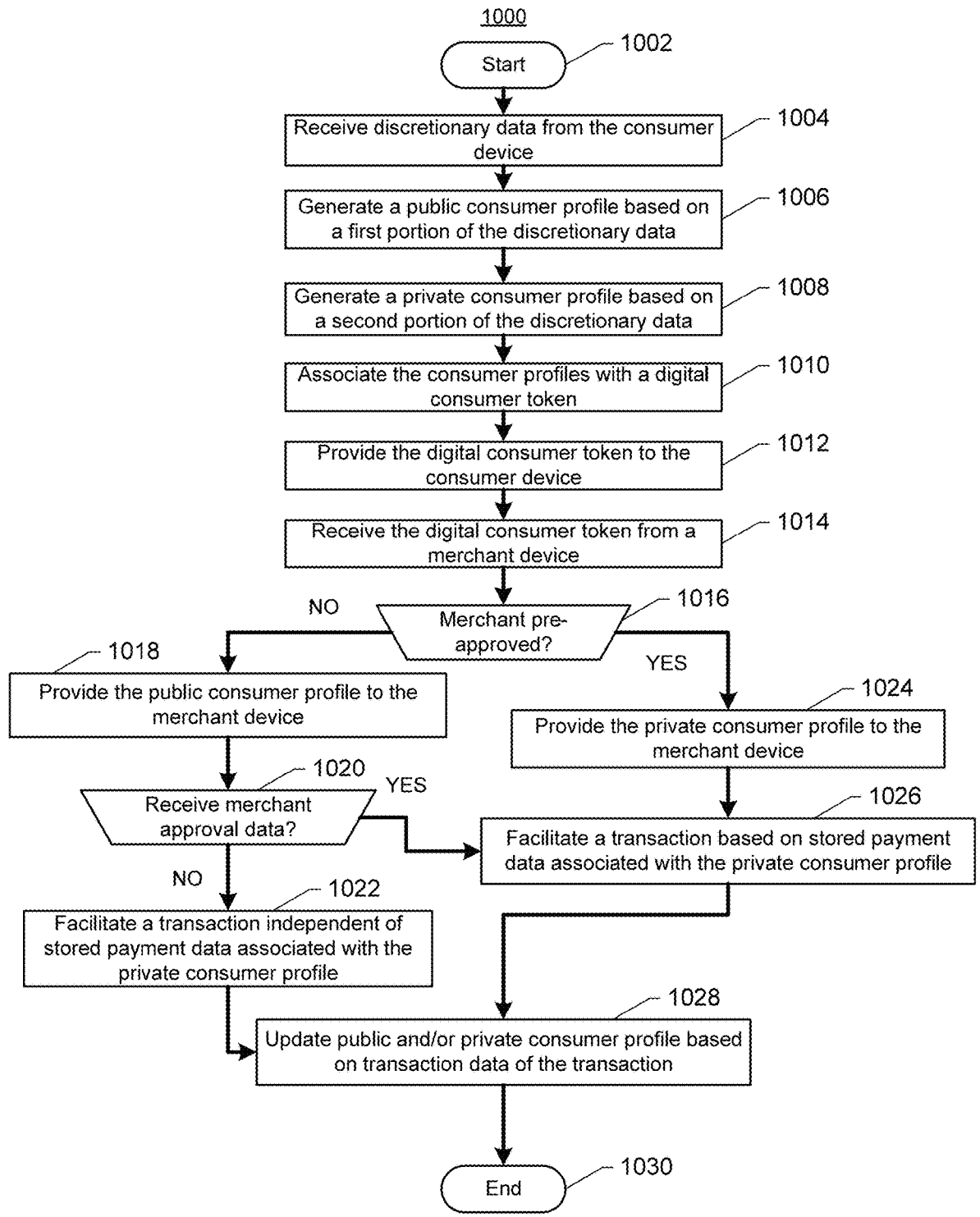

Having thus described some embodiments in general terms, reference will now be made to the accompanying drawings, which are not necessarily drawn to scale, and wherein:

FIG. 1 shows an example of a system configured in accordance with some embodiments;

FIG. 2 shows a schematic block diagram of example circuitry configured in accordance with some embodiments;

FIG. 3 depicts an example data flow illustrating interactions between a server, one or more consumer devices, and one or more merchant devices in accordance with some embodiments;

FIG. 4 shows a schematic block diagram of example circuitry configured in accordance with some embodiments;

FIG. 5 shows a schematic block diagram of example circuitry configured in accordance with some embodiments;

FIG. 6 shows a flowchart of an example of a method for generating one or more consumer profiles in accordance with some embodiments;

FIG. 7 shows a flowchart of an example method for updating consumer profiles based on tracking consumer activity in accordance with some embodiments;

FIG. 8 shows a flowchart of an example method for adapting a point-of-sale interface in accordance with some embodiments;

FIG. 9 shows a flowchart of an example method for menu item attribute discovery in accordance with some embodiments; and FIG. 10 shows a flowchart of an example of a method for providing public and private consumer profiles in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Some embodiments may provide for a computing system configured to facilitate improved consumer and merchant interactions. For example, the computing system may include a PA service (or "PA service") that is configured to facilitate transactions and communications between merchant devices (e.g., tablet computers, laptops, smartphones, wearable devices such as smart watches or smart eye glasses, etc.) and consumer devices (e.g., tablet computers, laptops, smartphones, wearable devices such as smart watches or smart eye glasses, etc.). The PA service leverages data from such transactions and communications to offer a service that appears "prescient" (i.e., appears to know preferences and/or requirements in advance) to both consumers and merchants alike.

In some embodiments, the PA service may be a third party central network supported by mobile software applications that are installed to one or more merchant devices and one or more consumer devices. In another embodiment, the PA service may be a merchant network supported by mobile software applications that are installed to one or more merchant devices and one or more consumer devices.

In some embodiments, the PA service may be configured to provide consumer identity (or consumer profile) management at multiple locations. The multiple locations may be associated with different merchants and/or other non-merchant organizations. The PA service may provide a centralized interface for consumer creation and management of the consumer profiles. For example, the PA service may allow consumers to selectively share digital consumer information with merchants (e.g., retail shops, restaurants, kiosks, spas, etc.) to facilitate communications and/or transactions, often without the consumer speaking a word or pressing a button.

For example, in some embodiments, the PA service is configured to allow the consumer to create one or more consumer profiles and populate the consumer profiles with digital consumer information. The PA service may receive discretionary data from a consumer device and may use the discretionary data to generate a public consumer profile and one or more private consumer profiles. Consumer data may be generated based on the discretionary data, and various subsets of the consumer data may be associated with the public consumer profile and the one or more private consumer profiles. In some embodiments, the contents of the profiles and the sharing of the contents (e.g., defining trusted or pre-approved merchants) may be defined by a set of sharing rules specified by the consumer device.

When a consumer carrying a consumer device running a PA service mobile application or otherwise suitably configured consumer device, and the consumer device comes into communication proximity to a merchant device running a PA service mobile application (i.e., the consumer walks into or near a merchant shop), the PA service may authenticate the consumer (e.g., based on receiving a digital consumer token associated with the consumer profiles) and determine whether the merchant device is pre-approved or trusted. Untrusted merchant devices may be provided with the public consumer profile. In this regard, for example, a restaurant merchant may understand that a given consumer has a peanut allergy simply by the consumer stepping through the restaurant door and without the consumer speaking a word. Similarly, trusted merchant devices may receive a suitable private consumer profile and the associated private consumer profile data (e.g., including payment data).

In some embodiments, the PA service may update a consumer profile and/or other consumer account information based on based on real-time consumer device signals and other contextual data. For example, the PA service may detect that a consumer is on vacation or on a business trip based on location data and calendar data supplied by the mobile software application running on the consumer device and thereby update the a public and/or private profile of the consumer with a "traveling" flag, which may assist merchants by allowing them to offer a more targeted set of "traveler" promotions that may of greater interest or relevance to the consumer.

In some embodiments, the PA service may be configured to allow the consumer to authorize sharing of private consumer profile and/or associated private consumer information (i.e., digital consumer information that is not part of the public consumer profile) by prompting the consumer to provide express authorization. In one example, such private consumer profiles may include stored payment information (e.g., credit card information) that is used to complete a transaction. The PA service may be configured to receive express authorization of the consumer in a variety for forms. For example, a consumer may confirm his/her express authorization to the PA service by engaging a consumer interface of the consumer device (e.g., pressing or swiping a buy button, etc.), by engaging one or more wearables (e.g., waving a hand or arm that is wearing a smart wristwatch, etc.), by providing a biometric identifier (e.g., a finerprint, retina scan, voice capture, etc.), by engaging a relevant merchant device (e.g., pressing or swiping a buy button, posing a "thumbs up sign" to a merchant device camera, etc.), or through a variety of additional means as discussed below. In that sense, the system may provide for on-demand approval of merchants for access to private consumer profile data. In some embodiments, a merchant may become trusted based on the on-demand approval for subsequent transactions.

In some embodiments, the PA service may be further configured, through a mobile software application running on a merchant device or a consumer device, to provide a point-of-sale (POS) interface that is adaptive to real-time conditions of the consumer. The point-of-sale interface may be displayed on a merchant device and/or consumer device (e.g., self-service) and may be customized based digital consumer information (e.g., the public and/or private consumer profiles). For example, in the above restaurant example, items including peanuts may be removed from the POS interface based on receiving peanut allergy information from the public consumer profile of the consumer. In some embodiments, the PA service may be further configured to provide payment processing, tab or checkout management, inventory management, employee/payroll management, promotion redemption, electronic marketing communications, and other functionality as discussed in detail below.

In some embodiments, the PA system may be further configured to aggregate digital consumer information, transaction data, discretionary data, location data, clickstream data, communication channel data, real-time consumer device signals, promotion data, product/inventory data, etc. and to apply machine-learning algorithms to improve the adaptive and prescient performance of the PA system. In some embodiments, aggregated and anonymized PA system data may be provided to merchants to support programmatically determined improvements of merchant goods, services, electronic marketing communications, point-of sale systems, employee management/training systems, inventory management systems, customer relationship management (CRM) systems, and other related systems as discussed in detail below.

The PA service may serve as an aggregator and as a communication hub between multiple different merchants and consumers. This may be particularly desirable for small business merchants that may not have the technological infrastructure, access, or traffic to support such data aggregation. The PA service may provide a hub for aggregated and/or anonymized data that can be distributed (e.g., based on sharing rules) between merchants of different sizes, types, industries, price bands, verticals, etc. In some embodiments, the PA service may be configured to facilitate crowdsourcing of information to fill data gaps or otherwise improve data quality.

In some embodiments, the PA system may be configured to provide merchants with programmatic inventory management and item attribute discovery. For example, the PA service may be configured to programmatically identify item attributes and taxonomies of merchant goods and services with minimal or no merchant interaction. In a restaurant example, the PA service may utilize sensors instrumented throughout a kitchen area to discover item attribute level data (e.g., ingredients for various dishes). The PA service may additionally or alternatively use crowdsourcing between merchants for item data. The item data, including attribute level data, may leveraged to determine item rankings, items including allergic ingredients, etc.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "prescient and adaptive point-of-sale service" or "PA service" may include a service that is accessible via one or more computing devices and that is operable to provide POS related services on behalf of one or more providers that offer goods, services, experiences and/or the like (or "items," as used herein). In some examples, the PA service may take the form of a payment processor, a menu generator, a tab or checkout manager, an inventory manager, an employee/payroll manager, a redemption authority, a rewards provider, an entity in a financial network, a promoter, an agent and/or the like. As such, the PA service is, in some example embodiments, configured to present point-of-sale interfaces (e.g., including one or more menu displays, check-out screens, promotion or item recommendations, promotion redemption displays, etc.), provide consumer information and/or consumer profiles to merchant devices to facilitate consumer service, generate menu displays that are tailored to consumer preferences, facilitate preparation of menu items, track merchant inventory levels and generate menus based on the inventory levels, process payments, order additional merchant inventory, and related activities.

In some embodiments, the PA service may be further configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The PA service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the PA service only for the purpose of gathering marketing information, demographic information, or the like, or receiving point-of-sale functionality.

As used herein, the term "consumer" should be understood to refer to a recipient of goods, services, promotions, media, or the like provided by the PA service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the PA service, where the PA service receives the cost value for each promotion sold to a consumer. The promotion may also include a "return on investment" value, representing a quantified expected return on investment to the merchant for each promotion sold.

For example, consider a promotion offered by the PA service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or PA service. This $22.50 would be the residual value of the promotion. If the PA service charged the merchant $3.00 to offer the promotion, the $3.00 fee would be the "cost value." The "return on investment" value of the promotion might be dynamically calculated by the PA service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical credential (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a PA service to provide improved point-of-sale interfaces and/or electronic marketing communications. Electronic marketing information may include, without limitation, clickstream data (defined below), transaction data (defined below), location data (defined below), communication channel data (defined below), discretionary data (defined below), real-time consumer device signals (defined below) or any other data stored by or received by the PA service for use in providing point-of-sale interfaces. In some embodiments, the electronic marketing information may further be used to provide electronic communications to consumers.

As used herein, the term "clickstream data" refers to electronic information indicating content viewed, accessed, edited, or retrieved by consumers. This information may be electronically processed and analyzed by a PA service to improve the quality of electronic marketing and commerce transactions offered by, through, and in conjunction with the PA service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the PA service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the PA service. For example, in some embodiments location data is provided by a location services circuitry, a location services module of a consumer mobile device, and/or location sensors (e.g., GPS, operating system location services, WiFi access point identification sensors, etc.) that are configured to generate electronic information or signals that are indicative of the context, position, or environment surrounding the consumer device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the PA service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the PA service), or any other data pertaining to the communication channel between the PA service and an entity external to the PA service.

As used herein, the term "discretionary data" refers to electronic information provided by a merchant or consumer explicitly to the PA service in support of improved interaction with the PA service. Upon registering with the PA service or at any time thereafter, the consumer or merchant may be invited to provide information that aids the PA service in providing services that are targeted to the particular needs of the consumer or merchant. For example, the discretionary data may include any suitable consumer information that can be used, such as consumer information related to health (e.g., undesirable ingredients such as allergy information, weight, blood pressure, etc.), habit information, consumer status, apparel size (e.g., shoe size, clothing size, etc.), color blindness, visual impairment, auditory impairment, price flexibility or price bands, transaction data (e.g., indicating past purchases), and/or environmental data (e.g., preferred weather, temperature, humidity, precipitation, etc.). A merchant may indicate the type of goods or services provided, their retail storefront location, ingredients or recipes for menu items, menu information, employee information, contact information, hours of operation, or the like.

It should be appreciated that the term "discretionary data" is intended to refer to information voluntarily and explicitly provided to the PA service, such as by completing a form or survey on a website or application hosted by the PA service. However, is should be appreciated that the examples of discretionary data provided above may also be determined implicitly or through review or analysis of other electronic marketing information provided to the PA service. It should also be appreciated that the PA service may also gate access to certain features or tools based on whether certain discretionary data has been provided. For example, the consumer may be required to provide information relating to their interests or location during a registration process.

As used herein, the term "real-time consumer device signals" refers to electronic information generated by sensor circuitry of a consumer device. For example, the sensor circuitry may include one or more environmental sensors (e.g., temperature, humidity, etc.), biological sensors (e.g., thermometer, heart rate monitor), visual sensors (e.g., a front facing camera configured to capture consumer expressions and/or gestures), and/or motion sensors (e.g., accelerometer, gyroscope, etc).

As used herein, the term "offering parameters" refers to terms and conditions under which a promotion is offered by a PA service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the PA service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a PA service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "electronic marketing communication" refers to any electronically generated information content provided by the PA service to a consumer for the purpose of marketing a promotion, good, or service to the consumer. Electronic marketing communications may include a consumer interface and may be provided via various communication channels such as email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the PA service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the PA service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the PA service based on electronic marketing information to assist with the operation of the PA service and/or one or more merchant systems. The various streams of electronic marketing information provided to and by the PA service allow for the use of sophisticated data analysis techniques that may be employed to identify correlations, relationships, and other associations among elements of electronic marketing information. These associations may be processed and formatted by the PA service to provide reports, recommendations, and services both internal to the PA service and to merchants in order to improve the process by which merchants and PA service engage with consumers.

For example, the PA service may analyze the electronic marketing information to generate customized menu interfaces that facilitate consumer service. For example, based on the electronic marketing information, the PA service may generate menus that are relevant to real-time preferences, conditions or habits of the consumer. Furthermore, the PA service may identify an increased demand for a particular product or service, and provide an electronic report to a merchant suggesting the merchant offer the particular product or service, or update the menu interface to include, recommend, or otherwise present the particular product or service. In another example, the PA service may identify that a particular product or service is not selling or resulting in the merchant losing money, customers, or market share (e.g., after consumers order a particular menu item, they never come back to the merchant), and suggest that the merchant should discontinue offering that product or service or remove the product or service from the menu interface.

It should be appreciated that the term "business analytic data" is intended to refer to electronically and programmatically generated data. For example, a printed report or letter manually drafted by an employee of the service would not be said to include business analytic data, even if said data was used by the employee during the drafting process, while a data disk or downloaded file containing analytics generated by the PA service would be considered business analytic data. Human interaction requires time, resources, introduces errors, and is incapable of efficiently considering large data collections, and thus various embodiments discussed herein include solutions to some or all of these technical problems.

As used herein, a "digital consumer token" refers to a key, code, identifier, or the like, that uniquely identifies a consumer device and/or consumer account record. For example, consumer profiles and/or consumer information of a consumer account record may be associated with a digital consumer token. The digital consumer token may be passed from consumer devices to merchant devices, and used by the merchant devices to access consumer information associated with the digital consumer token (e.g., via an exchange with the PA service).

As used herein, a "consumer account record" refers to a record of consumer information stored in one or more consumer account databases of the PA service. The consumer account record may be associated with one or more consumer profiles and each consumer profile may include associated consumer information and/or sharing rules that define which merchants or entities can receive the consumer information. In some embodiments, a consumer account record may be stored in a memory of a consumer device.

As used herein, a "consumer profile" refers to an organized collection or bundle of consumer information. A consumer profile may include consumer information such as interests, preferences, etc., which may be used to facilitate consumer interactions, generate customized point-of-sale interfaces, etc. A consumer profile may further be associated with or include sharing rules to allow for fine consumer control the dissemination of the consumer information.

As used herein, a "public consumer profile" refers to a consumer profile, a digital consumer bio, or other bundle of consumer information that is defined as being shared with merchant devices without requiring an express consumer input or authorization for each instance of sharing with merchant devices. Furthermore, the public consumer profile may be shared freely with merchant devices and/or other devices.

As used herein, a "private consumer profile" refers to a bundle of consumer information defined as being shared only express consumer input or authorization for each instance of sharing with merchant devices. The public consumer profile may only be shared with merchant devices that are pre-approved or otherwise trusted by the consumer. In some embodiments, a private consume profile may be associated with sensitive consumer information, such as payment data, health data, consumer-defined private data, etc.

Technical Underpinnings and Implementation of Exemplary Embodiments

Merchants, including manufacturers, wholesalers, and retailers, have spent a tremendous amount of time, money, manpower, and other resources to determine the best way to serve products and services to consumers. Whether a given consumer interaction is successful (at least from the merchant's perspective) is often determined based on the return-on-investment received to the merchant in terms of revenues, profits, and increased awareness of the merchant's goods and services when compared to the resources invested by the merchant to facilitate the consumer interaction. In other words, optimal point-of-sale techniques generally maximize the benefit to the merchant's bottom line while minimizing the cost spent (e.g., in terms of processing, memory, and/or networking resources) on facilitating the consumer interaction. To this end, a merchant's resources may be spent in a variety of different manners including conducting market and consumer research, identifying consumers, tracking consumer preferences, purchases, behaviors, or habits, training employees, offering targeted products or services, advertising, offering of discounts, conducting market research, among other things. The end goal of these activities is to ensure that consumer information is programmatically leveraged during consumer and merchant interactions, thus improving the efficiency of the interactions in terms of processing and memory resources, as well as the network throughput of associated data.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the point-of-sale process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. The PA service may be developed with sophisticated technologies that are configured to receive and process this data for the benefit of both merchants and consumers. The PA service may assist merchants with marketing or otherwise presenting their products to interested consumers, while reducing the chance that a consumer will be presented with marketing or menu information in which the consumer has no interest. The PA service may further leverage its access to the trove of electronic marketing information to assist merchants and consumers with other tasks, such as offering improved consumer profile and information management, improved merchant inventory and supply chain management, improved point-of-sale interfaces and menu displays, improved methods for delivering products and services, and the like.

Unlike conventional techniques related to the use of paper or other physical media (e.g., paper menus), the PA service may offer a wealth of additional electronic solutions to improve the experience for consumers and merchants. The ability to closely monitor consumer interactions (e.g., with impressions, purchases at other merchants, location data indicating consumer location, etc.) provides the ability for the PA service to gather data related to the time, place, and manner in which the consumer engaged with the electronic data (e.g., viewed, clicked, moused-over an impression and obtained and redeemed the promotion). The PA service may use this information to determine which products and services are most relevant to the consumer's interest, and to provide marketing materials related to said products and services to the consumer, thus improving the quality of the electronic marketing communications received by the consumer. The PA service may additionally or alternatively use this information to generate POS interfaces and menu displays that are targeted to the consumer, thus improving the quality a consumer's experience at a merchant shop.

Merchants may be provided with the ability to dynamically monitor and adjust the parameters of items, menu data, or promotions offered by the PA service, ensuring that the merchant receives a positive return on their investment. For example, the merchant can closely monitor the type, price or discount level, and quantity sold of a particular item (or promotion) on the fly, while with traditional printed menus the merchant would not be able to make any changes to after the menu has gone to print. Each of these advancements in digital point-of-sale involve problems unique to the digital environment not before seen in traditional point-of-sale activity.

Although electronic marketing information provides a wealth of information, the inventors have determined that existing techniques may not always leverage or process this information in an efficient or accurate manner. Technology continues to rapidly advance in the field of analytics and the processing of this information, offering improved data gathering and analysis techniques, resulting in more relevant and accurate results provided in a more efficient manner. Point-of-sale services continue to evolve and provide improved methods for engaging consumers and spreading awareness of products offered by the point-of-sale services.

In many cases, the inventors have determined that these services are constrained by technological obstacles unique to the electronic nature of the services provided, such as constraints on data storage, machine communication, interoperability, and processor resources. The inventors have identified that the wealth of electronic data available to these services and the robust nature of point-of-sale techniques present new data, network, and communication challenges never contemplated in the world of paper menus and physical marketing techniques (e.g., paper coupons). The inventors have further determined that even technological methods that leverage computers for statistical analysis and consumer behavior modeling (e.g., television rating systems) fail to address problems associated with providing relevant, high quality point-of-sale interfaces in a manner that maximizes accuracy, minimizes error, is user friendly and provides for efficient allocation of resources. Embodiments of the present invention as described herein serve to correct these deficiencies and offer improved resource utilization, thus providing improvements to electronic point-of-sale services that address problems arising out of the electronic nature of those services. For example, various embodiments may provide for accurate electronic authentication of consumers with little or no direct consumer action, accurate capture of item level data associated with transactions, accurate item or promotion targeting based on merchant and consumer information, sharing of consumer account data between merchants, among other things.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system 100 within which embodiments of the present invention may operate. Merchants may access a PA service 102 via a network 112 (e.g., the Internet, or the like) using computer devices 108A through 108N and 110A through 110N, respectively (e.g., one or more consumer devices 108A-108N or one or more merchant devices 110A-110N). Moreover, the PA service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process electronic marketing information provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various point-of-sale interfaces and menu displays, or electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the PA service 102. For example, the database 106 may include, without limitation, consumer account credentials for system administrators, one or more consumer profiles and related data (e.g., consumer preferences, information sharing rules, etc.), associations between consumer profiles and consumer identifying tokens, merchants, and consumers, data indicating the products and promotions offered by the PA service, menu item data, inventory data, employee information (e.g., skills, specializations, organizational role, shift or payroll data, background or employee profile information, etc.) clickstream data, transaction data, discretionary data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables (e.g., Google Glass®, Android® Wear watches, etc.), and the like. The information may be provided through various sources on these consumer devices.

In embodiments where a consumer device 108 is a mobile device, such as a smart phone or tablet, the consumer device 108 may execute a mobile device application (an "app" or "mobile app") to interact with the PA service 102. Such apps are typically designed to execute on mobile devices, such as tablets or smartphones. For example, a mobile software application or "app" may be provided that executes on mobile device operating systems such as Apple Inc.'s iOS®, Google Inc.'s Android®, or Microsoft Inc.'s Windows 8®. These platforms typically provide operating system frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The PA service 102 may leverage the application framework offered by the mobile operating system to allow consumers to designate which information is provided to the app and which information may then be provided to the PA service 102. In some embodiments, consumers may "opt in" to provide particular data to the PA service 102 in exchange for a benefit, such as improved relevancy of marketing communications offered to the user. In some embodiments, the consumer may be provided with privacy information and other terms and conditions related to the information provided to the PA service 102 during installation or use of the app. Once the consumer provides access to a particular feature of the mobile device, information derived from that feature may be provided to the PA service 102 to improve the quality of the consumer's interactions with the PA service and merchant devices.

For example, the consumer may indicate that they wish to provide location information to the app from location services circuitry included in their mobile device. Providing this information to the PA service 102 may enable the PA service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the PA service 102. For example, the consumer may decide at a later point to disable the ability of the app to access the location services circuitry, thus limiting the access of the consumer's location information to the PA service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion, or leverage social networking data to generate or update consumer information (e.g., one or more consumer profiles). It should be appreciated that the use of mobile technology and associated app may provide for particularly unique and beneficial uses of the PA service through leveraging the functionality offered by the various mobile operating systems.

Additionally or alternatively, the consumer device 108 may interact through the PA service 102 via a web browser. As yet another example, the consumer device 108 may include various hardware or firmware designed to interface with the PA service 102 (e.g., where the consumer device 108 is a purpose-built device offered for the primary purpose of communicating with the PA service 102, such as a store kiosk).

The merchant devices 110A-110N may be any computing device as known in the art and operated by a merchant. For example, the merchant devices 110A-110N may include a merchant point-of-sale device, a merchant e-commerce server, a merchant inventory system, or a computing device accessing a web site or app designed and configured to provide point-of-sale functionality (e.g., by accessing a PA service server 104 through an app or a web page via a browser using a set of merchant account credentials). Electronic data received by the PA service 102 from the merchant devices 110A-110N may also be provided in various forms and via various methods. For example, the merchant devices 110A-110N may provide menu data or menu item data (e.g., items offered, ingredients, price, etc.), or real-time transaction and/or inventory information as purchases are made from the merchant. In other embodiments, the merchant devices 110A-110N may be employed to provide information to the PA service 102 to enable the PA service 102 to generate promotions or other marketing information to be provided to consumers.

An example of a data flow for exchanging electronic information among one or more consumer devices, merchant devices, and the PA service is described below with respect to FIG. 3.

Example Apparatus[es] for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, consumer profile service circuitry 210, data collection circuitry 212, point-of-sale service circuitry 214, and kitchen service circuitry 216. The apparatus 200 may be configured to execute the operations described above with respect to FIG. 1 and below with respect to FIGS. 6-10. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, biometric reader (e.g., fingerprint and/or retina scanner), or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Consumer profile service circuitry 210 may include hardware configured to generate digital consumer tokens, provide the digital consumer tokens to consumer devices 108A-108N, manage consumer information (e.g., consumer records, consumer profiles, etc.) associated with digital consumer tokens, and provide the consumer information to merchant devices 110A-110N in response to receiving digital consumer tokens from the merchant devices. In some embodiments, consumer profile service circuitry 210 may be configured to provide a consumer interface to consumer devices to facilitate consumer profile management. Data collection circuitry 212 may include hardware configured to collect electronic marketing information (e.g., discretionary data, clickstream data, transaction data; consumer location data; real-time consumer device signals, etc.), which may be used by data collection circuitry 212 and/or consumer profile service circuitry 210 to generate, update, and/or otherwise manage the consumer information associated with a digital consumer token. Point-of-sale service circuitry 214 may include hardware configured to provide point-of-sale interfaces to merchant device. For example, a point-of-sale interface for a restaurant merchant may include a menu display including selectable menu items. Point-of-sale service circuitry 214 may provide customized point-of-sale interfaces based on receiving a digital consumer token, and using the consumer data (e.g., a consumer record, consumer profile, etc.) associated with the received digital consumer token. Kitchen service circuitry may be configured to facilitate menu item preparation, such as by providing menu item data (e.g., indicating ingredients and/or amounts of the ingredients of a menu item) to a kitchen display and/or by monitoring menu item preparation to programmatically generate the menu item data indicating ingredients of the menu item and/or inventory data indicating available ingredients.

Circuitry 210-216 may utilize processing circuitry, such as the processor 202, to perform these actions. However, it should also be appreciated that, in some embodiments, one or more of circuitries 210-216 may include a separate processor, specially configured field programmable gate array (FPGA), or application specific interface circuit (ASIC). Circuitry 210-216 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Consumer device(s) 108 may be embodied by one or more computing systems, such as apparatus 400 shown in FIG. 4. The depicted apparatus 400 includes processor 402, memory 404, input/output circuitry 406, communications circuitry 408, consumer profile management circuitry 410, sensor circuitry 412, and location services circuitry 414. The apparatus 400 may be configured to execute the operations described below with respect to FIGS. 1 and 6-8. The functioning of the processor 402, the memory 404, the input/output circuitry 406, and the communication circuitry 408 may be similar to the similarly named components described above with respect to FIG. 2. For the sake of brevity, additional description of these components is omitted.

Consumer profile management circuitry 410 may include hardware configured to create and manage consumer profiles and/or other consumer data, such as based in consumer inputs provided via input/output circuitry 406. The consumer information may be associated with a digital consumer token that can be exchanged between consumer and merchant devices as discussed herein to share various portions of the information managed by consumer profile management circuitry 410. In some embodiments, consumer profile management circuitry 410 may be configured to perform some or all of the techniques discussed herein with respect to consumer profile service circuitry 210.

Sensor circuitry 412 may be configured to generate real-time consumer device signals that may be used as electronic marketing data to customize the point-of-sale interfaces, update or create consumer profiles, and/or otherwise be provided to merchant devices to facilitate consumer-merchant interactions. For example, sensor circuitry 412 may include environmental sensors (e.g., temperature, humidity, etc.), biological sensors (e.g., thermometer, visual sensors (e.g., a front facing camera configured to capture consumer expressions and/or gestures), and/or motion sensors (e.g., accelerometers, gyroscopes, etc.).

Location services circuitry 414 may be configured to generate consumer device location data indicating the location of a consumer device and provide the consumer device location data to server 104. For example, location services circuitry 414 may use cell-tower triangulation, global positioning systems (GPS), internet protocol (IP) address, and/or any other suitable technique to determine the consumer device location data.

Merchant device(s) 110 may be embodied by one or more computing systems, such as apparatus 500 shown in FIG. 5. The depicted apparatus 500, which is configured for use in a restaurant, includes processor 502, memory 504, input/output circuitry 506, communications circuitry 508, point-of-sale circuitry 510, token interface circuitry 512, menu management circuitry 514, and kitchen circuitry 516. The functioning of the processor 502, the memory 504, the input/output circuitry 506, and the communication circuitry 508 may be similar to the similarly named components described above with respect to FIG. 2. For the sake of brevity, additional description of these components is omitted.

Point-of-sale circuitry 510 may include hardware configured to provide the point-of-sale interface on the merchant device. In some embodiments, point-of-sale circuitry 510 may communicate with point-of-sale service circuitry 214 of server 104. In some embodiments, point-of-sale circuitry 510 may be configured to perform some or all of the techniques discussed herein with respect to point-of-sale service circuitry 214. Token interface circuitry 512 may include hardware configured to receive digital consumer tokens, and may be further configured to exchange the digital consumer tokens for associated consumer data and/or point-of-sale interfaces generated based on the consumer data (e.g., among other things).

Menu management circuitry 514 may include hardware configured to facilitate menu creation and inventory management. For example, menu management circuitry 514 may be configured to generate menu item data, inventory data, etc., and to provide the generated data to point-of-sale service circuitry 214 of server 104. In some embodiments, menu and inventory management circuitry 510 may be configured to perform some or all of the techniques discussed herein with respect to point-of-sale service circuitry 214.

Kitchen circuitry 516 may be configured to perform menu item attribute discovery and may include various sensors that monitor menu item preparation to programmatically discover ingredients, ingredient amounts, preparation processes, and/or inventory management, as discussed in further detail below.

Example Prescient and Adaptive Point-of-Sale Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing the PA service to the consumer. This electronic marketing information may include, but is not limited to, location data, clickstream data, transaction data, communication channel data, and/or discretionary data.

In some embodiments, in response to receiving electronic marketing information from a consumer device 304, the server 302 may be configured to generate one or more consumer profiles. A consumer profile may include a bundle of consumer information and may include merchant sharing rules for the consumer information. For example, a consumer may create a "foodie" profile, associate favorite menu items with the foodie profile, associate disfavored items or ingredients (e.g., allergies), associate dine-in or seating preferences, etc.

In some embodiments, server 302 may generate a digital consumer token associated with one or more consumer profiles and provide the digital consumer token to consumer device 304. When consumer device 304 shares the digital consumer token with merchant device 306, which merchant device 306 may pass the digital consumer token to server 304. In response, server 304 may return a point-of-sale interface configured to facilitate consumer interactions based on the consumer information associated with the consumer profile. In another example, server 304 may provide consumer profile information and/or business analytic data relevant to the consumer to merchant device 306 based on receiving the digital consumer token identifying the consumer account or profile(s). In that sense, the PA service may allow a consumer carrying consumer device 304 to enter a merchant shop (e.g., with consumer device 304 being configured to broadcast a digital consumer token) to receive personalized, customized or targeted service without requiring additional consumer interactions with consumer device 304, the merchant, or merchant device 306 that may interrupt, inconvenience or otherwise complicate the real-time consumer merchant interaction.

In some embodiments, as a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of menu displays or marketing communications to individual consumers or groups of consumers. In this manner, the server 302 may determine promotions, goods, and services that are more likely to be of interest to a particular consumer or group of consumers based on clickstream data, discretionary data, transaction data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., profile information, discretionary data provided by the consumer, clickstream data such as a browser cookie that indicates they frequently visit websites that provide snowfall forecasts for particular ski resorts), prior transaction data, and offer promotions or items associated with that hobby (e.g., a promotion offering discounted ski equipment rentals or lift tickets). It should be appreciated that a variety of different types of electronic marketing information could be provided to the server 302 for the purpose of improving the relevancy of point-of-sale interfaces and/or marketing communications. It should also be appreciated that this electronic marketing information may be received from a variety of electronic sources, including various consumer devices, merchant devices, and other sources both internal and external to a PA service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to provide point-of-sale related services to consumers using the PA service. For example, the one or more merchant devices 306 may provide product data, menu item data, inventory data, and/or employee data to server 302. The sever 302 may receive this information and generate menu displays or point-of-sale interfaces that may be provided to merchant devices 306 Additionally or alternatively, point-of-sale interfaces and menu displays may be provided to consumer devices 304, such as for online ordering or consumer self-service.

In some embodiments, merchants may market their products using a PA service. For example, the one or more merchant devices 306 may provide promotion data defining one or more promotions to be offered by the PA service on behalf of the merchant. The server 302 may receive the promotion data and generate electronic marketing communications for providing such promotions via an e-commerce interface, making the promotions available for purchase by consumers. The server 302 may also receive product/inventory data about products from the one or more merchant devices 306. For example, a merchant may product/inventory data indicating particular products, product prices, inventory levels, and the like to be marketed via a PA service. The server 302 may receive this information and generate electronic marketing communications to offer the products to consumers.

The one or more merchant devices 306 may also receive information from the server 302. For example, in some embodiments a merchant may obtain access to certain consumer information and/or business analytic data aggregated, generated, or maintained by the server 302. As a particular example, a merchant's menu or point-of-sale interface may be customized based on the consumer information such as for ranking or ordering menu items within the point-of-sale interface, removing menu items including disfavored ingredients, etc.

Consumer Profile Management and Authentication

Some embodiments may provide for the establishment and management of consumer profiles than may be shared with or otherwise used by merchant devices to facilitate consumer and merchant interactions. For example, a consumer via consumer interface provided on a consumer device may define a consumer profile including consumer information such as interests, hobbies, age, gender, location, etc. The consumer may also be allowed to specify privacy settings or otherwise control the dissemination of consumer information. For example, the consumer may define sharing rules for a consumer profile (and/or the associated consumer information) that specify which merchants or merchant types can receive a consumer profile and/or a particular portion of consumer information.

In some embodiments, the consumer profiles may be managed by the consumer and stored on the consumer device. In another example, service 102 may provide for the management of the consumer profiles. For example, service 102 may receive discretionary data defining a consumer profile from a consumer device, generate and/or update the consumer profile based on the discretionary data, etc.

When a consumer walks into merchant locations carrying the consumer device, the consumer device may be configured to share a digital consumer token associated with the consumer profile with merchant devices. The merchant devices may then exchange the digital consumer token with service 102 to receive the consumer profile and/or consumer information. In another example, the consumer device may be configured to provide the consumer profile and/or consumer information to the merchant device (e.g., with or without a digital consumer token.

The applicable consumer profile and/or consumer information be automatically (e.g., without additional consumer device inputs) provided to merchant devices in accordance with the sharing rules. As such, (e.g., various different) merchants are able to identify the consumer and also receive relevant consumer information in a manner that appears seamless or prescient to the consumer. For example, a restaurant merchant may receive consumer information identifying allergies of the consumer and this consumer information may be leveraged to provide consumer service, such as for providing recommendations for a menu item or modifications to a menu item. Furthermore, in some embodiments, point-of-sale interfaces of the merchant devices may be generated based on the consumer profile and/or consumer information, such as point-of-sale interfaces having customized menus or other features. In that sense, the point-of-sale interface may be adaptive consumer profiles and/or consumer information.

In addition to discretionary data provided by the consumer device, consumer profiles may be updated by service 102 based on tracking consumer activity by merchant devices, consumer devices, and/or merchant networks (e.g., crowd-sourcing). For example, service 102 may aggregate and/or otherwise analyze transaction data of the consumer generate at various merchant locations to update a consumer profile with an interest or preference.

FIG. 6 shows a flowchart of an example of a method 600 of generating one or more consumer profiles. Method 600, as well as the other methods discussed herein, is described as being performed by one or more of the components of computing system 100. In some embodiments, method 600 may be performed by one or more suitably configured servers, apparatuses, storage devices, routers, network switches, etc.

Method 600 may begin at 602 and proceed to 604, where consumer profile service circuitry 210 of one or more servers 104 may be configured to generate a digital consumer token. The digital consumer token may be a type of data that is used by consumer devices to share consumer information with merchant devices. In some embodiments, digital consumer token may be a key, code, identifier, or the like, that uniquely identifies a consumer device and/or consumer account record. With reference to FIG. 1, for example, each consumer device 108A-108N may be associated with a different digital consumer token.

In some embodiments, the digital consumer token may be generated based on a random (i.e., pseudo random number generated) code that is independent of consumer identifying data (e.g., consumer name, contact information, payment information, etc.) and/or other consumer data associated with the consumer account record (e.g., electronic marketing information such as discretionary data, clickstream data, etc.). The digital consumer token may be an arbitrary unique ID or otherwise not reveal any sensitive consumer information when received by an unauthorized device. In some embodiments, the digital consumer token may include an internet protocol (IP) address, MAC address, and/or other unique consumer device identifier.

In some embodiments, consumer profile service circuitry 210 may be configured to generate the digital consumer token in response to receiving a request from consumer profile management circuitry 410 of consumer device 108. For example, the request may be provided via network 12 and in connection with login data (e.g., username and password, a biometric identifier, etc.) for access to the consumer account record. In some embodiments, the digital consumer token may be generated by the consumer device, such as by consumer profile management circuitry 410. In some embodiments, the consumer device may be configured to generate the digital consumer token, as well as perform some or all of the other steps of method 600.

At 606, consumer profile service circuitry 210 may be configured to associate the digital consumer token with a consumer account record of a consumer database. The consumer account record may be one or multiple consumer account records stored in the consumer database (e.g., database 106), each of which may be associated with a different digital consumer token. In some embodiments, such as where method 600 is performed by the consumer device, the digital consumer token may be generated by consumer profile management circuitry 410 of the consumer device.

At 608, consumer profile service circuitry 210 may be configured to provide the digital consumer token to the consumer device associated with the consumer account record. For example, consumer profile service circuitry 210 may provide the digital consumer token to the consumer device via network 112.

At 610, consumer profile service circuitry 210 may be configured to receive discretionary data from the consumer device. The discretionary data may be received via network 112 and may include electronic marketing information provided by the consumer, such as during a registration, profile creation, profile management, or other functionality. The discretionary data may indicate consumer interests, hobbies, age, gender, group membership, location, among other things that may be used in providing seamless consumer-merchant interactions for a variety of different merchants and/or merchant types (e.g., retail shops, dine-in restaurants, hotels, etc.).

At 612, consumer profile service circuitry 210 may be configured to generate one or more consumer profiles based on the discretionary data. A consumer profile, as used herein, refers to an organized collection or bundle of consumer information. Different consumer profiles may be associated with different aspects, personalities, or dimensions of a consumer. In some embodiments, the discretionary data received from the consumer device may define multiple consumer profiles, as well as the consumer information associated with the consumer profiles. In some embodiments, a single consumer profile may be used for each consumer or consumer account record. Here, the discretionary data may define sharing rules for portions of the discretionary data.

When a consumer account record is associated with a plurality of consumer profiles, different consumer profile may be applicable to different personas or roles of the consumer, and/or may be used with different merchants, merchant types, or verticals based on the items (e.g., products, services, or experiences) offered by the merchant to consumers. An example of a consumer profile may include a "foodie" profile, which may be used to generate point-of-sale interfaces that are tailored to the associated preferences of the foodie profile (e.g., favorite menu items, favorite categories of restaurant and/or food, undesirable ingredients, allergic ingredients, favorite drinks, preferred price ranges, etc.) and/or otherwise provided to merchant devices associated with restaurant merchants (e.g., as an informational display). Another example may include a "clothing shopper"

profile used with retail merchants, which may include apparel preferences, brand preferences, apparel size preferences, etc.

As discussed above, the consumer may define sharing rules that specify the portions of consumer information that is shared with various merchants, as well as the eligible merchants and/or merchant types that may access some or all of a consumer profile (e.g., based on exchanging the digital consumer token with server 104). For example, consumer profile management circuitry 410 of the consumer device may be configured to provide a rights management application that allows the consumer to define the sharing rules. As such, the consumer can carry the consumer device and broadcast the digital consumer token to merchant devices without the concern that sensitive information associated with the consumer account record and/or a consumer profile will be shared with unauthorized (e.g., merchant) devices. Furthermore, the consumer is not required or prompted to provide individual permission at each merchant shop or merchant device connection because the predefined sharing rules may be used.

In some embodiments, the sharing rules may define detailed taxonomies of consumer profiles and/or consumer information that is automatically shared and that which is only shared with express consumer authorization. For example, a sharing rule for a "medical patient" consumer profile that includes a consumer's medical history may specify that the consumer profile is only to be shared upon an express authorization from the consumer. In another example, a sharing rule may define portions of consumer information of a consumer profile as being publicly shared and portions as being shared only upon express authorization. As discussed in greater detail below with respect to FIG. 10, some embodiments may further include public consumer profiles and private consumer profiles.

At 614, consumer profile service circuitry 210 may be configured to associate the consumer profile(s) with the digital consumer token. In some embodiments, consumer profile service circuitry 210 may generate a single consumer profile for each consumer account record and digital consumer token. In some embodiments, each of multiple consumer profiles may be associated with a different digital consumer token. Here, each digital consumer token may uniquely identify not only the consumer account record, but also the associated consumer profile.

At 616, consumer profile service circuitry 210 and/or data collection circuitry 212 may be configured to track the consumer and/or consumer account record. For example, the tracking may be performed based on receiving the digital consumer token from merchant devices in connection with transaction data, location data, etc. Also as discussed above, the tracking may be used to update consumer profiles for subsequent merchant sharing and/or customized point-of-sale interface creation. The discussion of method 700 and FIG. 7 below may be applicable at 616. Method 600 may proceed to 618 and end.

FIG. 7 shows a flowchart of an example of a method 700 for updating consumer profiles and/or consumer information based on tracking consumer activity in accordance with some embodiments. In some embodiments, method 700 may be performed in connection with method 600, such as at 616.

Method 700 may begin at 702 and proceed to 704, where point-of-sale service circuitry 214 of one or more servers 104 may be configured to receive a digital consumer token from a merchant device indicating that the consumer device has provided the digital consumer token to the merchant device. For example, point-of-sale service circuitry 214 may be configured to connect with merchant devices 110A-110N and consumer devices 108A-108N via network 112. The consumer device may be configured to provide the digital consumer token to the merchant device when the consumer device is within proximity to the merchant device, such as upon entering a merchant shop where the merchant device is located and forming a network connection (e.g., a direct wireless connection and/or PAN connection) with the merchant device. In another example, the consumer device may be configured to provide the digital consumer token to the merchant device via network 112, which in turn may be provided to the one or more servers 104 by the merchant device via network 112. In some embodiments, rather than transferring a digital consumer token, the consumer device may receive a digital merchant token that identifies the merchant device and/or merchant. Here, the consumer device may provide the digital merchant token to the one or more servers, and thus the one or more servers are able to associate the consumer device with the merchant device and/or merchant.

At 706, point-of-sale service circuitry 214 may be configured to, in response to receiving the digital consumer token, identify a consumer account record based on the digital consumer token. For example, the consumer account record may be identified as the consumer account record associated with the digital consumer token at 608 of method 600. In some embodiments, point-of-sale service circuitry 214 may be configured to query the consumer database using the digital consumer token, and in response, may receive consumer data associated with the consumer account record.

At 708, point-of-sale service circuitry 214 may be configured to provide a consumer profile associated with consumer account record to the merchant device. For example, the consumer profile may be provided with a point-of-sale interface to facilitate consumer service including adding items to a tab and completing transactions for the items. The consumer profile may include the discretionary data provided by the consumer device and authorized by the consumer for sharing with the merchant. In some embodiments, the consumer profile may include other types of electronic marketing information (e.g., location data, transaction data, clickstream data, etc.) which can be learned based on tracking consumer behaviors or activities with the digital consumer token.

In some embodiments, point-of-sale service circuitry 214 may be configured to determine a selected consumer profile from a plurality of consumer profiles associated with the digital consumer token. For example, the consumer profile may be determined based on the associated sharing rules and the merchant or merchant type. As such, the "foodie" profile may be selected for a restaurant merchant or the "clothing shopper" profile for a retail merchant. In another example, based on sharing rules, portions of consumer information associated with the "foodie" profile may be shared automatically with the restaurant merchant, while the consumer device may be prompted for express authorization for sharing other portions of consumer information as stipulated by the sharing rules. Furthermore, various consumer device signals and/or other real-time signals (e.g., time, consumer device location, weather data, etc.) may also be used to select a particular consumer profile. For example, by tracking consumer device locations over time and/or based on discretionary data received from consumer devices, point-of-sale service circuitry 214 may associate particular locations and times as sharing rules for particular consumer profiles. The associated locations and times of a consumer profile, for example, may be compared with a current consumer device location and current time, to select an applicable consumer profile.

In some embodiments, point-of-sale service circuitry 214 configured to provide the consumer profile may include the point-of-sale service circuitry being configured to, without requesting an authorization from the consumer device, provide a public consumer bio associated with the digital consumer token to the merchant device. Advantageously, a consumer may generate and/or update the public consumer profile data at a prior time (e.g., at home), and thus can specify the types of information that is freely shared with merchants and without requiring consumer input when the information is shared with merchant devices.

In some embodiments, point-of-sale service circuitry 214 may be further configured to provide private digital consumer information when suitable. For example, point-of-sale service circuitry 214 may be configured to provide an interface and/or request to the consumer device for express authorization to share the private digital consumer information with the merchant device. The express authorization may be generated via the consumer device and can take various forms, such as a touch on a touchscreen, a voice command, a facial expression, a motion of the consumer captured by a camera and/or of the consumer device captured by a motion sensor, etc. In some embodiments, the express authorization may be generated via the merchant device, or a non-point-of-sale device of the merchant. For example, the merchant device and/or one or more cameras may be positioned around a merchant location for capturing facial expressions or the like, and reporting the captured information to the point-of-sale service circuitry 214. The content of the private consumer information may also be set at a prior time to the sharing with merchants, which advantageously reduces the required consumer inputs for approving the private consumer information at the time of sharing. For example, a single click, tap, key press, etc. on the consumer device may be used to approve sharing of stored information that has been designated as private consumer information.

In response to receiving the express authorization, point-of-sale service circuitry 214 may be configured to provide the private digital consumer information to the merchant device. The consumer may be allowed to define the types of consumer information that is kept as private digital consumer information, which may include payment information, medical health information, clothing size information, sensitive biographical information, etc.). Furthermore, in some embodiments, sharing rules may be defined which allocates portions of consumer information as being part of the public consumer bio and other portions of consumer information as being part of the private digital consumer information that requires further authorization for sharing.

In some embodiments, the consumer device may be configured to provide the digital consumer token with at least a portion of the consumer profile (and/or consumer information) directly the merchant device and without assistance from service 102. For example, consumer devices and merchant devices may be provided with interoperability via a token sharing standard that specifies the format and other requirements of messages to exchange digital consumer tokens for consumer information. Additionally or alternatively, point-of-sale service circuitry 214 may be configured to provide application programming interfaces (APIs) to the consumer devices and merchant devices to facilitate the functionality discussed herein with respect to consumer profile sharing. In some embodiments, merchants may be allowed to bid and/or otherwise provide incentives to consumers for sharing consumer profiles and/or consumer information with merchant devices.

In some embodiments, a merchant might offer to pay for consumer demographic data and/or consumer profile data related to products or services offered by the merchant. It should be appreciated however, that a merchant may not need to list any products or services via the PA service in order to obtain such data. For example, the PA service may enable merchants to access electronic marketing data offered via the PA service based on a subscription model. The one or more merchant devices 306 may also receive electronic compensation data from the server 302. For example, when a promotion or product is sold by the PA service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

After the consumer information has been provided to the merchant device, the merchant device may be configured to generate electronic marketing information (e.g., transaction data) which can be used to further update a consumer profile. At 710-716, data collection circuitry 212 of the one or more servers 104 may be configured to receive the electronic marketing information from merchant devices and/or the consumer device. One or more of the examples of electronic marketing information discussed at 710-716 may be received (e.g., not necessarily in the order shown in FIG. 7) and used to programmatically update one or more consumer profiles associated with the consumer account record.

At 710, data collection circuitry 212 may be configured to receive a digital consumer token in connection with transaction data from a merchant device. Point-of-sale circuitry 510 of the merchant device may be configured to provide the point-of-sale interface for associating items (e.g., menu items for a restaurant merchant) with a tab and facilitating a transaction for the associated items. The transaction data of the transaction may indicate consumer payment or billing information, consumer shipping information, items purchased by the consumer, a merchant rewards account number associated with the consumer, the type of shipping selected by the consumer for fulfillment of the transaction, and/or the like.

In some embodiments, the consumer device may be configured to send the digital consumer token to token interface circuitry 512 of the merchant device when the consumer device is at or near the merchant device. In response, token interface circuitry 512 may be configured to send the digital consumer token to server 104, such as via network 112 to data collection circuitry 212 and/or consumer profile service circuitry 210.

In some embodiments, the consumer device and merchant device may be configured to form a direct wireless connection when the consumer device is within a direct wireless communicable range of the merchant device for sharing of the digital consumer token (e.g., among other things). For example, the direct wireless connection may include a personal area network (PAN) connection utilizing one or more Bluetooth protocols. Additional details regarding presence-based direct wireless connections between consumer devices and merchant devices, applicable in some embodiments, are discussed in U.S. patent application Ser. No. 13/801,610, titled "Consumer Presence Based Deal Offers," which is incorporated by reference herein in its entirety. In another example, the consumer device and merchant device may communicate with each other via network 112. In some embodiments, the transaction data may include consumer approval data signed or encrypted with the digital consumer token, which is also discussed in greater detail in U.S. patent application Ser. No. 13/801,610.

In some embodiments, a digital consumer token may be configured to provide a proven referral chain of consumers. For example, a consumer device upon receiving a digital consumer token from a different consumer device in connection with a referral may be configured to sign the received consumer device with the digital consumer token of the consumer device. As such, upon receiving the signed digital consumer token, data collection circuitry 212 may be able to determine both the consumer account record associated with the consumer device and the referrer.

In some embodiments, digital consumer tokens may be used to form groups of consumers. For example, multiple digital consumer tokens may be combined and/or otherwise collected to generate family or group tokens. The group can then be used to split bill payments, create (e.g., ad hoc, based on real-time consumer device signals and consumer profile information) promotional offers, among other things.

At 712, data collection circuitry 212 may be configured to receive the digital consumer token in connection with location data from a merchant device. The merchant device at 712 may be same merchant device as discussed at 710, or may be a different merchant device associated with a different merchant. In that sense, the consumer's activity at various merchant shops may be collected by server 104.

The location data may indicate the location of the consumer device. In some embodiments, data collection circuitry 212 of server 104 may be configured to determine the location data based on a merchant location associated with the merchant device. For example, each merchant device 110A-110N may be associated with a merchant location where the merchant device is located. As discussed above, when the consumer device comes within the direct wireless communicable range of the merchant device (e.g., 10 meters), the consumer device may provide the digital consumer token to the merchant device. Data collection circuitry 212 may determine the location data based on receiving the digital consumer token from the merchant device associated with the merchant location.

In some embodiments, data collection circuitry 212 may be alternatively or additional configured to receive location data from the consumer device. For example, location services circuitry 414 of the consumer device may be configured to determine the location data and provide the location data to data collection circuitry 212 via network 112. Location services circuitry 414 may be configured to determine the location data based one or more of global positioning service receivers, indoor navigation systems, cellular tower triangulation techniques, video surveillance systems, and/or radio frequency identification (RFID) location systems.

At 714, data collection circuitry 212 may be configured to receive clickstream data from the consumer device associated with the digital consumer token. The clickstream data may include electronic marketing information indicating content viewed, accessed, edited, or retrieved by consumers. As discussed above, various consumer device interactions that may be received from the consumer device may include mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like At 716, data collection circuitry 212 may be configured to receive real-time consumer device signals from the consumer device. For example, the consumer device may include sensor circuitry 412 including one or more environmental sensors (e.g., temperature, humidity, etc.), biological sensors (e.g., thermometer, heart rate monitor), visual sensors (e.g., a front facing camera configured to capture consumer expressions and/or gestures), motion sensors (e.g., accelerometer, gyroscope, etc.). In some embodiments, the real-time consumer device signals may be received in connection with transaction data, consumer location data, and/or clickstream data. Here, the real-time consumer device signals may indicate consumer and/or environmental conditions (e.g., at the consumer device location) in which the electronic marketing information is generated. Advantageously, by leveraging the various real-time consumer device signals that may be available, consumer profile service circuitry 210 may be configured to programmatically (e.g., without consumer inputs) select consumer profiles, determine consumer conditions that may be relevant to the consumer merchant interaction, and/or generate menu displays tailored to the consumer.

At 718, consumer profile service circuitry 210 may be configured to update the consumer profile (and/or consumer account record) based the electronic marketing data information received at one or more of 710-716. For example, consumer profile service circuitry 210 may be configured to determine the consumer profile based on querying a consumer database of consumer account records using the digital consumer token, and may be further configured to incorporate the electronic marketing information with the determined consumer profile.

The transaction data and/or clickstream data may indicate consumer preference for a particular item, merchant, and/or price. The location data may indicate preferred merchants and/or locations of the consumer (e.g., home, work, commute route, etc.). The real-time consumer device signals may indicate consumer and/or environmental conditions in which the consumer expresses the consumer preference. In some embodiments, electronic marketing information received at 706-712 may be further associated with time data indicating a time at which the electronic marketing information was generated and/or received by data collection circuitry 212. The time data may be used to determine temporal aspects that impact consumer preferences. The location data may be used to determine spatial aspects that impact consumer preferences. In that sense, the consumer profile may include consumer preferences and conditions or criteria (e.g., location, time, sensor data, etc.) under which the consumer preferences are applicable.

In some embodiments, such as where a plurality of consumer profiles are associated with the digital consumer token, consumer profile service circuitry 210 may be configured to update multiple consumer profiles determined to be relevant based on the electronic marketing information.

For example, transaction data from a restaurant merchant device may be used to update the "foodie" profile. In another example, clickstream data indicating promotional content viewed, accessed, edited, or retrieved by the consumer may be used to update the "shopper" profile. Method 700 may then proceed to 716 and end.

Prescient and Adaptive Point-of-Sale Interfaces

FIG. 8 shows a flowchart of an example of a method 800 of adapting a point-of-sale interface in accordance with some embodiments. Method 800 may be performed by point-of-sale service circuitry 214 to provide point-of-sale interfaces to the merchant device that are adaptive to consumer preferences, among other things. In some embodiments, the merchant device may include menu management circuitry 514 configured to perform some or all of the steps of method 800.

Method 800 may begin at 802 and proceed to 804, where point-of-sale service circuitry 214 of one or more servers 104 may be configured to receive menu item data from a merchant device 110 associated with a merchant indicating menu items offered by the merchant and associated ingredients of the menu items. For example, menu management circuitry 514 may be configured to receive the menu item data from menu management circuitry 514 of merchant device 110 via network 112. In some embodiments, the menu item data may further indicate associated categories and/or other taxonomy of menu items (e.g., lunch items, dinner items, appetizers, deserts, drinks, etc.). In some embodiments, the menu item data may include price data indicating prices associated with the menu items offered by the merchant.

At 806, point-of-sale service circuitry 214 may be configured to receive inventory data from the merchant device indicating available ingredients of menu items offered by the merchant. For example, the inventory data may indicate that supply of an ingredient of the menu item has been exhausted or is otherwise unavailable. In some embodiments, data collection circuitry 212 and/or point-of-sale service circuitry 214 may be configured to determine the inventory data based on transaction data received from the consumer device. For example, the transaction data may include an indication of purchased (e.g., menu) items. Point-of-sale service circuitry 214 may be further configured to determine ingredients associated with the purchased items, and remove the ingredients from the available ingredients to determine the inventory data. In some embodiments, the inventory data may define available inventory at the item level (e.g., in alternative or addition to the ingredient level). For example, the inventory data may indicate available menu items of the menu items offered by the merchant.

At 808, point-of-sale service circuitry 214 may be configured to receive a digital consumer token from a merchant device indicating that the consumer device has provided the consumer device to the merchant device. The merchant device that receives the digital consumer token at 808 may be same device that provided the inventory data at 806 (and/or the menu item data at 804), or alternatively, may be a different device. In some embodiments, the merchant device that provides the inventory data may be part of a backend inventory system. The backend inventory system may include bar code readers, RFID readers, or other inventory management devices. In contrast, the merchant device that receives the digital consumer token at 808 may be a point-of-sale device of the merchant. In some embodiments, the same merchant device may be configured to perform each of the steps discussed in method 800.

At 810, point-of-sale service circuitry 214 may be configured to, in response to receiving the digital consumer token, identify a consumer account record based on the digital consumer token. For example, the consumer account record may be identified as the consumer account record associated with the digital consumer token at 608 of method 600. In some embodiments, point-of-sale service circuitry 214 may be configured to query the consumer database using the digital consumer token, and in response, may receive an indication of the consumer account record.

At 812, point-of-sale service circuitry 214 may be configured to determine candidate menu items from menu items offered by the merchant based on the inventory data and the menu item data. As discussed above, the inventory data may indicate available ingredients of the menu item for preparation and the menu item data may indicate the associated ingredients of the menu items. In some embodiments, point-of-sale service circuitry 214 may be configured to determine each of the menu items offered by the merchant and/or defined through the menu data as candidate menu items.

At 814, point-of-sale service circuitry 214 may be configured to determine menu item scores for the candidate menu items based on electronic marketing information associated with the consumer account record. The menu item scores may provide an indication as to the relevance of the menu item to the consumer account record and/or consumer profile. As discussed (e.g., in methods 600 and 700), the electronic marketing information used to determine the menu item scores may include discretionary data, clickstream data, transaction data, consumer location data, one or more real-time consumer device signals. The electronic marketing information may further include consumer information associated with a public consumer profile and/or a private consumer profile.

In some embodiments, the electronic marketing information used to determine the menu item scores may include consumer price preference. For example, the consumer price preference data may be compared with price data indicating prices associated with the menu items offered by the merchant. In some embodiments, the consumer price preference data may be determined based on one or more of the transaction data, the clickstream data, and the discretionary data. For example, the consumer price preference data may indicate a targeted price range determined based on tracking the consumer activity (e.g., purchases of similar items or categories) with the digital consumer token as discussed in method 700. In another example, the consumer price preference data may be determined based on discretionary data (e.g., a consumer defined price range) provided from the consumer device. In some embodiments, point-of-sale service circuitry 214 may be configured to determine the price of the menu items dynamically. For example, price may be determined based on system-wide trends (e.g., based on transaction data from multiple merchants) to provide price elasticity and/or comparative pricing capabilities.

In some embodiments, point-of-sale service circuitry 214 may be configured to determine the menu item scores based on the electronic marketing information associated with the consumer profile. For example, circuitry 214 may receive the electronic marketing information including one or more real-time consumer device signals indicating one or more of a consumer device time and a consumer device location, determine a selected consumer profile from the plurality of consumer profiles based on the one or more real-time consumer device signals, and provide the selected consumer profile to the merchant device via the network. Various other real-time consumer device signals discussed herein may also be used, including those from wearable devices such as electronic wristbands or glasses.

At 816, point-of-sale service circuitry 214 may be configured to determine a ranking of the candidate menu items based on the menu item scores. For example, menu items with higher menu item scores may be ranked higher than menu items with lower scoring menu item scores.

At 818, point-of-sale service circuitry 214 may be configured to determine selectable menu items of a menu display from the candidate menu items based on the ranking. For example, menu items having menu item scores that satisfy a predefined threshold may be selected for inclusion as a selectable menu item of the menu display.

In some embodiments, point-of-sale service circuitry 214 may be configured to create a default menu item. The default menu item may include each menu item offered by the merchant, or each menu item offered that is currently available as determined based on inventory levels. Here, based on the consumer data, point-of-sale service circuitry 214 may update default items, such as by removing undesirable items, reordering items, adding custom items, etc.

At 820, point-of-sale service circuitry 214 may be configured to generate a point-of-sale interface including the menu display including the selectable menu items. As discussed above, the electronic marketing information used to select menu items or otherwise configure the point-of-sale interface may include data collected by the merchant (e.g., in the course previous transactions), or may include third party data received from a third party system and/or other one or more other third party merchant(s) that use the (e.g., central) PA service. Furthermore, the point-of-sale interfaces customized for the consumer may be updated and improved over time based on continued receiving and processing of electronic marketing information (e.g., transaction data, real-time consumer device signals, discretionary data, etc.). The electronic marketing information may be generated by the merchant device, a third party merchant device and/or system, and/or the consumer device. Advantageously, a single merchant device may be able to programmatically generate a customized point-of-sale interface for each identified consumer. As such, the merchant inputs required to facilitate customized service is decreased and more complex data manipulations (e.g., adding or removing an ingredient, custom orders, facilitating secure payments, etc.) is simplified and more efficient.

At 822, point-of-sale service circuitry 214 may be configured to provide the point-of-sale interface to the merchant device that sent the consumer device token, such as via network 112. For example, the merchant device may be a tablet computer that is given to consumers at their table for reviewing the menu display, or used by a merchant operator while assisting the consumers at the table. The merchant may be allowed to select between multiple customized menu displays based on the consumer being served. In some embodiments, a near field communication or other proximity detection technique may be used such that customized menus are selected for presentation in the menu display based on proximity of the merchant device to consumer devices. In some embodiments, the point-of-sale interface may alternatively or additionally be provided to the consumer device associated with the consumer device token (e.g., via a mobile device app).

In some embodiments, the point-of-sale interface may include adaptive displays that provide upsell, bundling, and/or other recommendations for menu item that may be particularly relevant or otherwise featured for the consumer.

In some embodiments, the electronic marketing information may indicate an undesirable ingredient, such as an allergic or otherwise disfavored food type. Point-of-sale service circuitry 402 may exclude a menu item including the undesirable ingredient, or may include with the menu item with an indication that the menu item includes the undesirable ingredient.

In some embodiments, point-of-sale service circuitry 214 may provide a warning message when a menu item including an undesirable ingredient is added to a tab. For example, point-of-sale service circuitry 214 may be configured to: receive input data indicating a selected menu item from the selectable menu items of the menu display, in response to receiving the input data indicating the selected menu item, determine whether the selected menu item includes the undesirable ingredient based on the menu item data indicating the ingredients of the menu items; and provide a warning indication (e.g., a pop up display) to the point-of-sale interface when the selected menu item includes the undesirable ingredient. In some embodiments, point-of-sale service circuitry 214 may provide a remove ingredient button to the point-of-sale interface when the selected menu item includes the undesirable ingredient. Based on selection of the remove ingredient button, point-of-sale service circuitry 214 may be configured to associate the selected menu item without the undesirable ingredient with the tab. A "button," as used herein, may be a virtual graphic, icon, shape, etc., that is presented within an interface. In another example, an undesirable ingredient may be removed from menu items that include the ingredient by default. Advantageously, selection of the menu item may result in adding the menu item to the order and with the undesired ingredient removed without any additional merchant inputs (e.g., specifically to remove the ingredient). The consumer profile information and/or electronic marketing information may be leveraged to generate point-of-sale interfaces and associated functionality that customized for consumers.

In some embodiments, the point-of-sale interface may be adjusted for different merchant employee capabilities or functions. For example, point-of-sale service circuitry 214 may be configured to track merchant interactions and inputs for merchant accounts, where each merchant account is associated with a particular user (e.g., an employee, manager, representative, clerk, etc.). Based on the inputs, point-of-sale service circuitry 214 may determine a skill score indicating the merchant's familiarity or capability with the interface. Depending on the familiarity or skill score, various functionality may be enabled or disabled. For example, the point-of-sale interface may include more contextual hints or fewer features for less advanced used than more advanced users. In some embodiments, similar inferences may be made for consumer device inputs on the consumer device, and various consumer device interfaces may also be changed accordingly. In some embodiments, point-of-sale service circuitry 214 may be configured to provide other merchant management functionalities, such as automated labor management, employee stress markers (e.g., heart rate, blood pressure, etc.) based on signals from wearable merchant devices, track misappropriated goods, etc.

In some embodiments, point-of-sale service circuitry 214 may be configured to customize the point-of-sale interface based on the device specifications of the receiving merchant device or consumer device. For example, the merchant device may be a tablet, while the consumer device may be a mobile phone. Here, the different screen dimensions and other specifications may be used to further update the point-of-sale interface including the visual appearance, location, or size of various interface components (e.g., menus, buttons, images, etc.).

At 824, point-of-sale service circuitry 214 may be configured to receive transaction data from the merchant device generated via the point-of-sale interface. The discussion at 710 of method 700 may be applicable at 824. In some embodiments, point-of-sale service circuitry 214 may be configured to provide different point-of-sale workflows or functionality. For example, a single merchant may be associated with multiple merchant devices that are dedicated to different roles, such as wait staff, manager, chef, etc. Point-of-sale service circuitry 214 may be configured to provide the consumer information, profiles, menu item data, menu displays, etc. to a suitable merchant device based on the role of the merchant user. In some embodiments, point-of-sale service circuitry 214 may be configured to configure workflows based on online consumer device inputs. For example, consumers may be allowed to select menu items via network 112 (e.g., the Internet when the consumer device is not proximate to the merchant device), which may be associated with a tab. Here, point-of-sale service circuitry 214 may be configured to facilitate post item selection functionality when the consumer device enters the merchant shop, such as automatic item preparation, bill creation, table reservation, etc.

At 826, point-of-sale service circuitry 214 may be configured to update the consumer account record based the transaction data. The discussion at 718 of method 700 may be applicable at 826. Method 800 may then proceed to 828 and end.

Menu Item Attribute Discovery

FIG. 9 shows a flowchart of an example of a method 900 of menu item attribute discovery in accordance with some embodiments. For example, based on receiving various sensor data, method 900 may be performed to programmatically and seamlessly (e.g., without requiring manual intervention) generate menu item data. The menu item data may include ingredients and their amounts for menu items, and may also Method 900 may be performed by kitchen circuitry 516 of a merchant device 110 and/or by kitchen service circuitry 216 of one or more servers 104. For example, kitchen circuitry 516 may be part of a merchant device that is located in the kitchen of a restaurant merchant that communicates with kitchen service circuitry 216. In another example, kitchen circuitry 516 and/or processor 502 of merchant device 110 may be configured to perform some or all of the steps of method 900.

Method 900 may begin at 902 and proceed to 904, where kitchen service circuitry 216 of one or more servers 104 may be configured to initiate monitoring of menu item preparation. In some embodiments, kitchen service circuitry 216 may be configured to receive menu item data from point-of-sale circuitry 510 that indicates menu items have been added to a tab, such as via the point-of-sale interface as discussed at 820. Subsequent to receiving the menu data, kitchen service circuitry 216 may be configured to facilitate preparation of each menu item. Additionally or alternatively, a preparer may be allowed to select a particular menu item for preparation. When menu item data is available, kitchen service circuitry 216 may be configured to provide menu item data regarding the selected menu item (e.g., known ingredients, amounts, preparation instructions, etc.) to a display of the merchant device. The display may include an indication of ingredients, timer, preparation steps, etc. In some embodiments, the display may be located on a wearable device, such as electronic glasses or a wristband (e.g., including a display).

At 906, kitchen service circuitry 216 may be configured to receive sensor data indicating merchant inclusion of an ingredient with the menu item. The sensor data may be used to generate the menu item data, monitor menu item preparation conformity to the stored menu item data, and/or to update the stored menu item data based on the received sensor data.

In some embodiments, the menu item preparer may wear a wristband device and/or other wearable device configured to generate the sensor data. The wearable device may be worn on a chef or other preparer of the item, such as around the hands in an example of a wristband device. The wearable device may include a radio frequency identification (RFID) reader configured to interrogate RFID tags when brought within proximity (e.g., near field range) of the RFID tags. At the food preparation station, each ingredient container may include an RFID tag such that when a preparer wearing the wristband reaches into a container, the RFID reader may record an identifier of the container. Based on receiving a particular identifier, kitchen service circuitry 216 may be configured to determine an ingredient and generate menu item data that associates the ingredient with the menu item.

In some embodiments, the wearable device may be configured to facilitate preparation, including special orders or modifications. For example, when the preparer's hand brings the wearable device to an ingredient container of an excluded ingredient (e.g., based on consumer data such as allergies, merchant input, etc.), the wearable device may generate an audio or tactile (e.g., vibrational) indication. In another example, when the wearable device is brought into proximity with an ingredient container that includes a wanted ingredient, the wearable device may generate a different audio or tactile indication.

In another example, image recognition techniques may be used. For example, the wearable device may be electronic glasses configured to record images of the wearer's view to generate image data. Kitchen service circuitry 216 may be further configured to process the image data to determine the ingredients being added to a menu item and/or removed from an ingredient container. In some embodiments, the containers may include barcodes that can be visually recognized by kitchen service circuitry 216 using image processing and recognition techniques.

At 908, kitchen service circuitry 216 may be configured to determine, based on the sensor data, an amount of the ingredient included with the menu item. Ingredient containers may include and/or be placed on scales configured to measure weight. Differences in weight, before an ingredient is removed from the ingredient container versus after it is removed in the process of preparing a menu item, may be used to determine amounts of the ingredient that belongs in the menu item. In some embodiments, kitchen service circuitry 216 may be configured to average and/or otherwise incorporate multiple readings for a menu item to determine more reliable ingredient amounts. Furthermore, kitchen service circuitry 216 may provide user interfaces to the merchant device that allow the merchant to enter ingredients and amounts. In some embodiments, kitchen service circuitry 216 may be further configured to provide indications as to whether the amount of an ingredient being added is too much or too little, such as by comparing current changes in weight of the ingredient container against stored (e.g., in database 106) menu item data indicating ingredient amounts.

At 910, kitchen service circuitry 216 may be configured to determine, based on the sensor data, an order that ingredients were added to the menu item during preparation and/or other preparation instructions. For example, kitchen service circuitry 216 may monitor the times at which different ingredients are added to determine the order of ingredients. Furthermore, kitchen service circuitry 216 may programmatically determine other preparation instructions or steps, such as temperatures of various cooking steps (e.g., based on sensor data from thermometer(s)), the times in which an item is kept at a particular temperature, optional or substitute ingredients, etc.

At 912, kitchen service circuitry 216 may be configured to determine whether preparation of the menu item is completed. For example, where kitchen service circuitry 216 can access stored preparation instructions (e.g., including the ingredients to be added, amounts, times, temperatures, etc.), kitchen service circuitry 216 may be configured to use the sensor data for monitoring preparation to determine whether the preparation has been completed in accordance with the preparation instructions. For example, where an ingredient has been left out, kitchen service circuitry 216 may provide an indication to the kitchen display or other communication (e.g., audio in the example of a wristband device without video capability).

In response to determining that preparation is incomplete, method 900 may return to 906, where kitchen service circuitry 216 may continue to receive sensor data associated with preparation of the menu item. In response to determining that preparation is complete, method 900 may proceed to 914, where kitchen service circuitry 216 may be configured to generate menu item data indicating associated ingredients of the menu item. Furthermore, the menu item data may indicate any other preparation instructions. In some embodiments, kitchen service circuitry 216 may be configured to determine that preparation is complete based on a merchant input from the user interface provided to the merchant device.

At 916, kitchen service circuitry 216 may be configured to confirm the menu item data based on merchant device input and/or crowdsource menu item data. For example, user interface of the merchant device may be provided with the menu item data generated during the monitoring of the preparation. The user interface may allow the merchant to confirm the menu item data and make any appropriate adjustments. Furthermore, the user interface may allow merchant to define categories and/or taxonomies of (e.g., menu) items. Merchants may be allowed to share their item data and provide recommendations to each other via merchant devices.

In some embodiments, kitchen service circuitry 216 may be configured to interface with different merchant types or verticals. Here, different merchants may define different categories or taxonomies for item (or service) data. For example, merchants can define retail taxonomies, clothing taxonomies, food taxonomies, events/movies taxonomies, etc.

In some embodiments, the menu item data may be compared with and/or other determined based on crowdsource menu item data. For example, kitchen service circuitry 216 of system 102 may collect menu item data from different merchant devices 110A-110N. Based on the merchant item data collected from different merchants, including category and taxonomy data, kitchen service circuitry 216 may be configured to build menu item profiles. For example, a menu item profile for Caesar Salad may include menu item data collected from multiple restaurants offering Caesar Salad with the most common ingredients and/or amounts.

In some embodiments, kitchen service circuitry 216 may be configured to aggregate data from multiple (e.g., all) merchants of system 100. For example, kitchen service circuitry 216 may generate surveys, track transaction data, analyze menu data, among other things to predict consumer trends, generate price recommendations, generate detailed (e.g., SKU-level) category or taxonomy data, provide cost control features, etc.

At 918, kitchen service circuitry 216 may be configured to provide the menu item data to a kitchen display. The menu item data may be used to facilitate subsequent preparation. For example, the kitchen display may be a display device located at a preparation station. In another example, the kitchen display may be electronic glasses worn by the preparer. In another example, the kitchen display may be included with a mobile merchant device, such as a tablet. The menu item data may be specific to the particular merchant, or may include crowdsourced menu item data. Method 900 may then proceed to 920 and end.

Public and Private Consumer Profiles

FIG. 10 shows a flowchart of an example of a method 1000 for providing public and private consumer profiles in accordance with some embodiments. The PA service may service as a central system that facilitates consumer profile and consumer data sharing with multiple merchant devices associated with different merchants. Advantageously, the merchant devices may be otherwise unassociated with each other with the PA service providing interoperability between each of the consumer devices and merchant devices. The PA service may provide universal consumer identity management for consumers via efficient, centralized consumer interfaces. Based on consumer specifications, the PA service may share consumer profiles and consumer information with merchants. Furthermore, the PA service may track consumer activity in the form transactions or other activity, and may use the tracking to programmatically update the consumer profiles. As such, in addition to being a centralized supplier of consumer information created by consumers, the PA service may also be a centralized aggregator of consumer and/or transaction data on behalf of merchants. Advantageously, the central aggregation of consumer data may allow the PA service to provide "big data" capabilities even to smaller merchants that would otherwise have lack access to useful or representative aggregated data.

Method 1000 may begin at 1002 and proceed to 1004, where one or more servers 104 (e.g., including consumer profile service circuitry 210) may be configured to receive discretionary data from the consumer device. The discussion above at 610 may be applicable at 1002. For example, the discretionary data may be received via network 112. In some embodiments, server 104 and/or the consumer device (e.g., including consumer profile management circuitry 410) may be configured to provide a consumer interface to receive consumer device inputs that define the discretionary data. The discretionary data may include electronic marketing information provided by the consumer, such as during a registration, profile creation, profile management or other functionality. For example, the discretionary data may indicate consumer interests, hobbies, age, gender, group membership, location, among other things. In some embodiments, the discretionary data may be generated on the consumer device via a rights management application, a mobile application, a web browser application, etc.

At 1006, the one or more servers 104 may be configured to generate a public consumer profile based on a first portion of the discretionary data. For example, the discretionary data received from the consumer device may further define sharing rules that indicate which merchants or merchant types can receive a particular consumer profile and/or a particular portion of consumer information. In some embodiments, the rights management application may prompt the consumer to provide discretionary data intended to be used with the public consumer profile.

A public consumer profile includes consumer information defined as being shared with merchant devices (e.g., or any other device) without requiring an express consumer input or authorization for each instance of the sharing. For example, the consumer device may be configured to broadcast a digital consumer token, and a merchant device that receives the digital consumer token may exchange the digital consumer token for the public consumer profile with PA service 102.

The public consumer profile may include non-sensitive consumer information that can facilitate consumer service by merchants using merchant devices. For example, the public consumer profile may include food or allergy preferences of the consumer that may be used by a restaurant merchant or associated merchant device as discussed herein. In another example, a public consumer profile may include dress size, or shoe size, etc. to facilitate consumer interactions with retail clothing merchants. In some embodiments, a public consumer profile may be anonymous or otherwise not reveal a consumer's identifying data such as name, image, etc.

At 1008, the one or more servers may be configured to generate a private consumer profile based on a second portion of the discretionary data. The private consumer profile may include consumer information that is only shared based on prompting the consumer to provide express authorization for each instance of sharing with a merchant device. In that sense, a consumer can create or manage a digital identity, sharing less sensitive consumer information with one or more public consumer profiles and more sensitive consumer information with one or more private consumer profiles.

At 1010, the one or more servers 104 may be configured to associate the public consumer profile and the private consumer profile with a digital consumer token or consumer device token. The discussion at 614 of method 600 may be applicable at 1010. For example, consumer profile service circuitry 210 may be configured to generate a digital consumer token and associate the digital consumer token with the public consumer profile and/or the private consume profile. In some embodiments, a first digital consumer token (or "public consumer token") may be associated with the public consumer profile and a second digital consumer token (or "private consumer token") may be associated with the private consumer profile.

At 1012, the one or more servers 104 may be configured to provide the digital consumer token to the consumer device. The discussion at 608 of method 600 may be applicable at 1012.

At 1014, the one or more servers 104 (e.g., point-of-sale service circuitry 214) may be configured to receive the digital consumer token from a merchant device. The discussion at 704 of method 700 may be applicable at 1014. For example, the merchant device may be located at a merchant shop, and in some embodiments, may further provide point-of-sale functionality at the merchant shop. The merchant device may be configured to receive the digital consumer token from the consumer device, such as via a direct wireless connection (e.g., Bluetooth, WiFi, RFID, near field communication, etc.). In response to receiving the digital consumer token, the one or more servers 104 may be further configured to send the digital consumer token to the PM service and/or server 104.

In some embodiments, the consumer device may be configured to wirelessly broadcast the digital consumer token, such as by using a Bluetooth protocol or other PAN technology. While broadcasting, the digital consumer token may be freely shared with nearby merchant devices, such as without explicit consumer approval for each instance of the sharing. In some embodiments, the consumer device may provide a user interface or other input capable of enabling or disabling the broadcasting.

At 1016, the one or more servers 104 may be configured to determine whether the merchant device is authorized to receive the private consumer profile. For example, the determination may include determining with the merchant associated with the merchant device is a pre-approved merchant for receiving a private consumer profile. The merchant device may be associated with a merchant such as by receiving a merchant identifier from the merchant device, login data associated with a merchant account, and/or any other suitable technique. Based on determining the merchant using the communications with the merchant device, the one or more servers 104 may compare the merchant name, merchant category (e.g., defining types of items offered by the merchant), or characteristics of the merchant (e.g., stored in a merchant database 106 of the PA service 102) with sharing rules associated with the private consumer profile to determine whether the merchant is authorized to receive the private consumer profile. In some embodiments, such as where the consumer device token is associated with multiple private consumer profiles (e.g., for particular purposes), the one or more servers may be configured to determine whether the merchant is authorized to receive any of the multiple private consumer profiles based on the predefined sharing rules.

In response to determining that the merchant is not authorized to receive the private consumer profile, method 1000 may proceed 1018, where the one or more servers 104 may be configured to provide the public consumer profile to the merchant device. The PM service 102 may thus provide information sharing services on behalf of the consumer with merchants or other entities. In some embodiments, the one or more servers 104 may be configured to provide the public consumer profile without any determination as to merchant eligibility for a private consumer profile, such as programmatically in response to receiving an associated consumer device token. In some embodiments, the one or more servers 104 may be further configured to adapt a point-of-sale interface of the merchant device based on the public consumer profile. In that sense, the discussion above in method 800 and FIG. 8 may be applicable to method 1000.

At 1020, the one or more servers 104 may be configured to determine whether merchant approval data indicating consumer approval for access to a private consumer profile has been received from the consumer device. For example, the consumer device may be configured to send the merchant approval data to the PM service 102 via network 112 based on consumer device inputs generated on the consumer device. Here, because the merchant is not pre-approved for access to a private consumer profile, the consumer may be provided an opportunity to provide express authorization via the consumer interface.

The merchant approval data may take various forms. For example, the merchant approval data may include consumer approval data in connection with an electronic payment. Here, the merchant approval data may indicate express consumer permission for merchant access to payment data associated with a private consumer profile. In another example, the merchant approval data may include discretionary data defining sharing rules that indicate the merchant is allowed to access a private consumer profile. The merchant approval data may be generated by the consumer device using various inputs such as a touchscreen input, a voice input, a motion data input (e.g., motion of the device as may be measured by an accelerometer and/or gyroscope). In some embodiments, the merchant approval data may further provide for enhanced security, such as by including a biometric identifier (e.g., fingerprint, retina scan, etc.), PIN number, etc. In some embodiments, the merchant approval data may further be secured through encryption or electronic signature, such as by applying the digital consumer token (e.g., a random or pseudorandom code) to facilitate the encryption or electronic signature. In some embodiments, the consumer device may generate the merchant approval data based on a request from the merchant device and/or the point-of-sale service circuitry of the one or more servers.

In response to determining that merchant approval data for access to a private consumer profile has not been received, method 1000 may proceed to 1022, where the one or more servers 104 may be configured to facilitate a transaction independent of stored payment data (e.g., if any) associated with the private consumer profile. In some embodiments, a default point-of-sale interface or a point-of-sale interface generated based on the public consumer profile may be provided to the merchant device to generate transaction data. The payment may be completed without using stored payment data, such as via cash, credit card, check, etc.

Returning to 1020, in response to determining that the merchant approval data for access to a private consumer profile has been received, method 1000 may proceed to 1026, where the one or more servers 104 may be configured to facilitate a transaction based on stored payment data associated with the private consumer profile.

Returning to 1016, in response to determining that the merchant is authorized to receive the private consumer profile, method 1000 may proceed to 1024, where the one or more servers 104 may be configured to provide the private consumer profile to the merchant device. The one or more servers 104 may be further configured to adapt a point-of-sale interface of the merchant device based on the public consumer profile as discussed above in connection with method 800 and FIG. 8. Method 1000 may then proceed to 1026 as discussed above.

At 1028, the one or more servers 104 (e.g., consumer profile service circuitry 210) may be configured to update the public and/or private consumer profile based on transaction data associated with the transaction. The discussion at 718 of method 700 may be applicable at 1028. In some embodiments, the consumer interface of the consumer device may further be configured to allow the consumer to define sharing rules that specify the merchants or merchant types for which transaction data may be used to update a public consumer profile or a private consumer profile. Furthermore, the consumer may be allowed to access the programmatically updated profile data, may modify (e.g., modify, add, remove) the updated profile data, and/or may define sharing rules for the updated data (e.g., associating the data with one or more public or private consumer profiles). In some embodiments, in addition or alternative to transaction data, the public and/or private consumer profile may be updated based on various electronic marketing information received from consumer devices and/or merchant devices. For example, the public and/or private consumer profile may be updated based on real-time consumer device signals sent from the consumer device and/or merchant device, based on clickstream data received from the consumer device, etc. As discussed above, the electronic marketing information may include third party data received from third party merchant devices and/or systems.

In some embodiments, some or all of the steps of method 1000 discussed herein with respect to the consumer interface may be performed by the consumer device, such as by a consumer profile management circuitry 410. For example, the consumer device may provide for the creation of discretionary data, creation of consumer profiles based on discretionary data, and the sharing of various consumer profiles based on sharing rules. In embodiments where a central system such as the PA service is not used for profile management, the consumer profiles and associated consumer data may be stored on the consumer device (e.g., in a memory) and/or a remote storage that can be accessed by the consumer device for sharing with merchant devices or directly by the merchant devices. Method 1000 may then proceed to 1030 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising one or more computers and one or more storage devices storing instructions that are operable, when executed by the one or more computers, to cause the one or more computers to:

generate a first consumer profile for a consumer identity, wherein the first consumer profile comprises digital purchasing preference data deemed to be sharable with merchant devices without requiring express authorization associated with the consumer identity;

generate a second consumer profile for the consumer identity, wherein the second consumer profile comprises digital payment data deemed not to be shareable with merchant devices without requiring express authorization associated with the consumer identity;

generate a digital consumer token associated with the first consumer profile and the second consumer profile;

provide the digital consumer token to a consumer device associated with the consumer identity; and facilitate, via a merchant device, a transaction associated with the consumer identity based on the first consumer profile or the second consumer profile.

2. The system of claim 1, wherein the one or more storage devices store instructions that are operable, when executed by the one or more computers, to further cause the one or more computers to:

determine authorization data for the merchant device.

3. The system of claim 2, wherein the one or more storage devices store instructions that are operable, when executed by the one or more computers, to further cause the one or more computers to:

select the first consumer profile or the second consumer profile for the transaction based on the authorization data for the merchant device.

4. The system of claim 2, wherein the one or more storage devices store instructions that are operable, when executed by the one or more computers, to further cause the one or more computers to:

render, based on the authorization data for the merchant device, a point-of sale interface that is customized for the consumer identity based on the second consumer profile that comprises the digital payment data.

5. The system of claim 2, wherein the one or more storage devices store instructions that are operable, when executed by the one or more computers, to further cause the one or more computers to:

receive the digital consumer token associated with a consumer device;

identify the first consumer profile based on the digital consumer token; and render a point-of sale interface that is customized for the consumer identity based on the first consumer profile that comprises the digital purchasing preference data.

6. The system of claim 1, wherein the one or more storage devices store instructions that are operable, when executed by the one or more computers, to further cause the one or more computers to:

provide the first consumer profile to the merchant device to cause rendering, at the merchant device, of a point-of sale interface that is customized for the consumer identity based on the digital purchasing preference data of the first consumer profile.

7. The system of claim 1, wherein the one or more storage devices store instructions that are operable, when executed by the one or more computers, to further cause the one or more computers to:

receive a merchant identifier associated with the merchant device;

apply one or more sharing rules associated with the second consumer profile to a merchant account associated with the merchant identifier to determine if the merchant device is a trusted merchant device; and in response a determination that the merchant device is a trusted merchant device, provide the second consumer profile to the merchant device.

8. The system of claim 1, wherein the one or more storage devices store instructions that are operable, when executed by the one or more computers, to further cause the one or more computers to:

receive, from the merchant device, transaction data associated with the transaction; and update at least one of the first consumer profile and the second consumer profile based on the transaction data.

9. The system of claim 1, wherein the one or more storage devices store instructions that are operable, when executed by the one or more computers, to further cause the one or more computers to:

receive discretionary data from the consumer device, wherein the discretionary data indicates that a particular merchant identifier is pre-approved to receive the second consumer profile;

receive a merchant identifier associated with the merchant device;

determine if the merchant identifier is associated with the particular merchant identifier; and in response to a determination that the merchant identifier is associated with the particular merchant identifier, provide the second consumer profile to the merchant device.

10. A computer-implemented method, comprising:

generating, by processing circuitry of one or more servers, a first consumer profile for a consumer identity, wherein the first consumer profile comprises digital purchasing preference data deemed to be sharable with merchant devices without an authorization associated with the consumer identity;

generating, by the processing circuitry, a second consumer profile for the consumer identity, wherein the second consumer profile comprises digital payment data deemed not to be shareable with merchant devices without an authorization associated with the consumer identity;

generating, by the processing circuitry, a digital consumer token associated with the first consumer profile and the second consumer profile;

providing, by the processing circuitry, the digital consumer token to a consumer device associated with the consumer identity; and facilitating, by the processing circuitry and via a merchant device, a transaction associated with the consumer identity based on the first consumer profile or the second consumer profile.

11. The computer-implemented method of claim 10, further comprising:

determining, by the processing circuitry, authorization data for the merchant device.

12. The computer-implemented method of claim 11, further comprising:

selecting, by the processing circuitry, the first consumer profile or the second consumer profile for the transaction based on the authorization data for the merchant device.

13. The computer-implemented method of claim 11, further comprising:

rendering, by the processing circuitry and based on the authorization data for the merchant device, a point-of sale interface that is customized for the consumer identity based on the second consumer profile that comprises the digital payment data.

14. The computer-implemented method of claim 11, further comprising:

receiving, by the processing circuitry, the digital consumer token associated with a consumer device;

identifying, by the processing circuitry, the first consumer profile based on the digital consumer token; and rendering, by the processing circuitry, a point-of sale interface that is customized for the consumer identity based on the first consumer profile that comprises the digital purchasing preference data.

15. The computer-implemented method of claim 10, further comprising:

providing, by the processing circuitry, the first consumer profile to the merchant device to cause rendering, at the merchant device, of a point-of sale interface that is customized for the consumer identity based on the digital purchasing preference data of the first consumer profile.

16. The computer-implemented method of claim 10, further comprising:
    receiving, by the processing circuitry, a merchant identifier associated with the merchant device;
    applying, by the processing circuitry, one or more sharing rules associated with the second consumer profile to a merchant account associated with the merchant identifier to determine if the merchant device is a trusted merchant device; and
    in response to determining that the merchant device is a trusted merchant device, providing, by the processing circuitry, the second consumer profile to the merchant device.

17. The computer-implemented method of claim 10, further comprising:
    receiving, by the processing circuitry and from the merchant device, transaction data associated with the transaction; and
    updating, by the processing circuitry, at least one of the first consumer profile and the second consumer profile based on the transaction data.

18. A computer program product, stored on a computer readable medium, comprising instructions that when executed by one or more computers cause the one or more computers to:
    generate a first consumer profile for a consumer identity, wherein the first consumer profile comprises digital purchasing preference data deemed to be sharable with merchant devices without an authorization associated with the consumer identity;
    generate a second consumer profile for the consumer identity, wherein the second consumer profile comprises digital payment data deemed not to be shareable with merchant devices without an authorization associated with the consumer identity;
    generate a digital consumer token associated with the first consumer profile and the second consumer profile;
    provide the digital consumer token to a consumer device associated with the consumer identity; and
    facilitate, via a merchant device, a transaction associated with the consumer identity based on the first consumer profile or the second consumer profile.

19. The computer program product of claim 18, wherein the instructions, when executed by the one or more computers, further cause the one or more computers to:
    render, based on authorization data for the merchant device, a point-of sale interface that is customized for the consumer identity based on the second consumer profile that comprises the digital payment data.

20. The computer program product of claim 18, wherein the instructions, when executed by the one or more computers, further cause the one or more computers to:
    receive the digital consumer token associated with a consumer device;
    identify the first consumer profile based on the digital consumer token; and
    render a point-of sale interface that is customized for the consumer identity based on the first consumer profile that comprises the digital purchasing preference data.

* * * * *